Feb. 8, 1966   J. B. WAGNER   3,233,412
CONTROL SYSTEM
Filed Nov. 12, 1963   13 Sheets-Sheet 1

INVENTOR:
JAMES B. WAGNER
BY Isidore Match
ATTORNEY

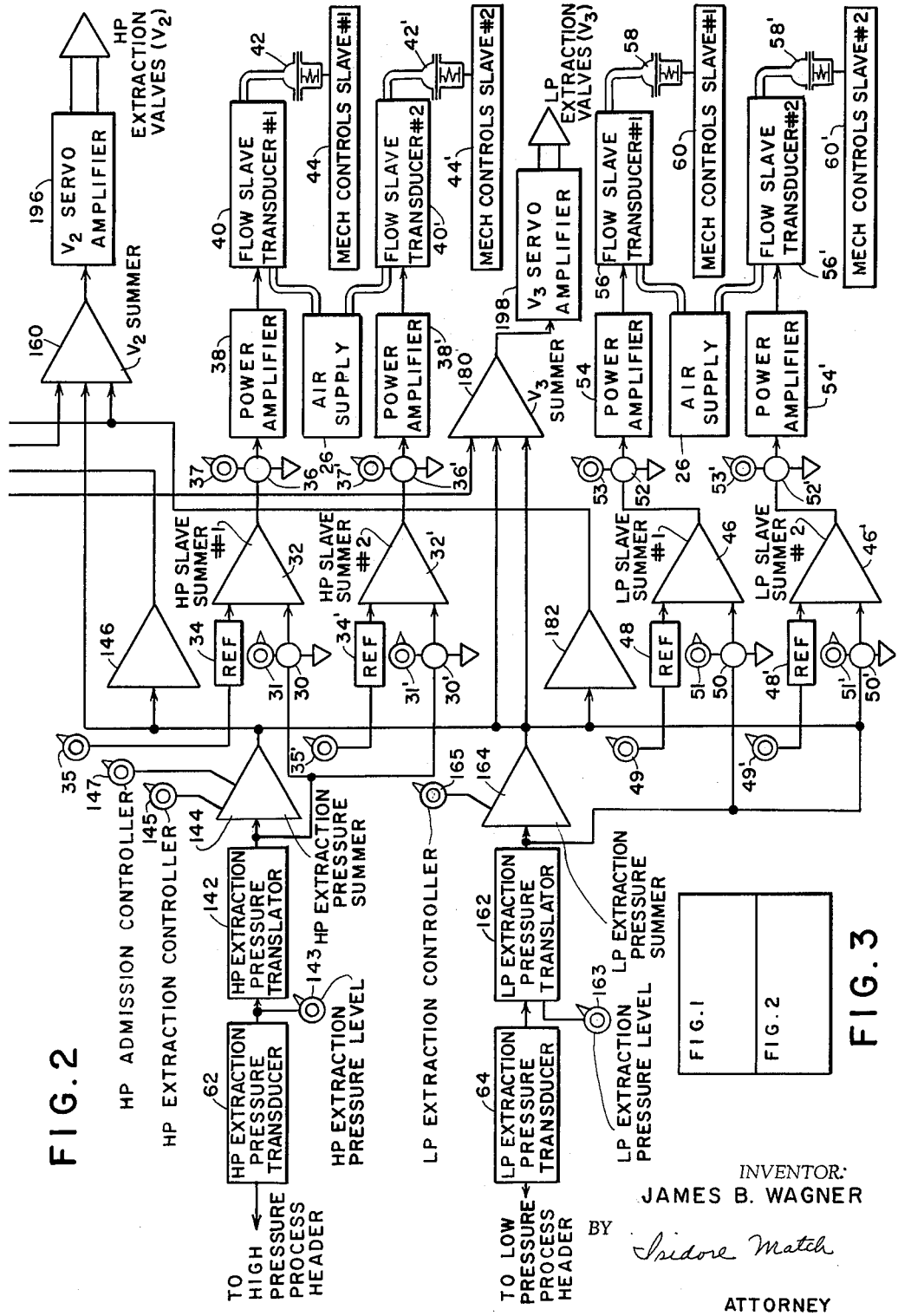

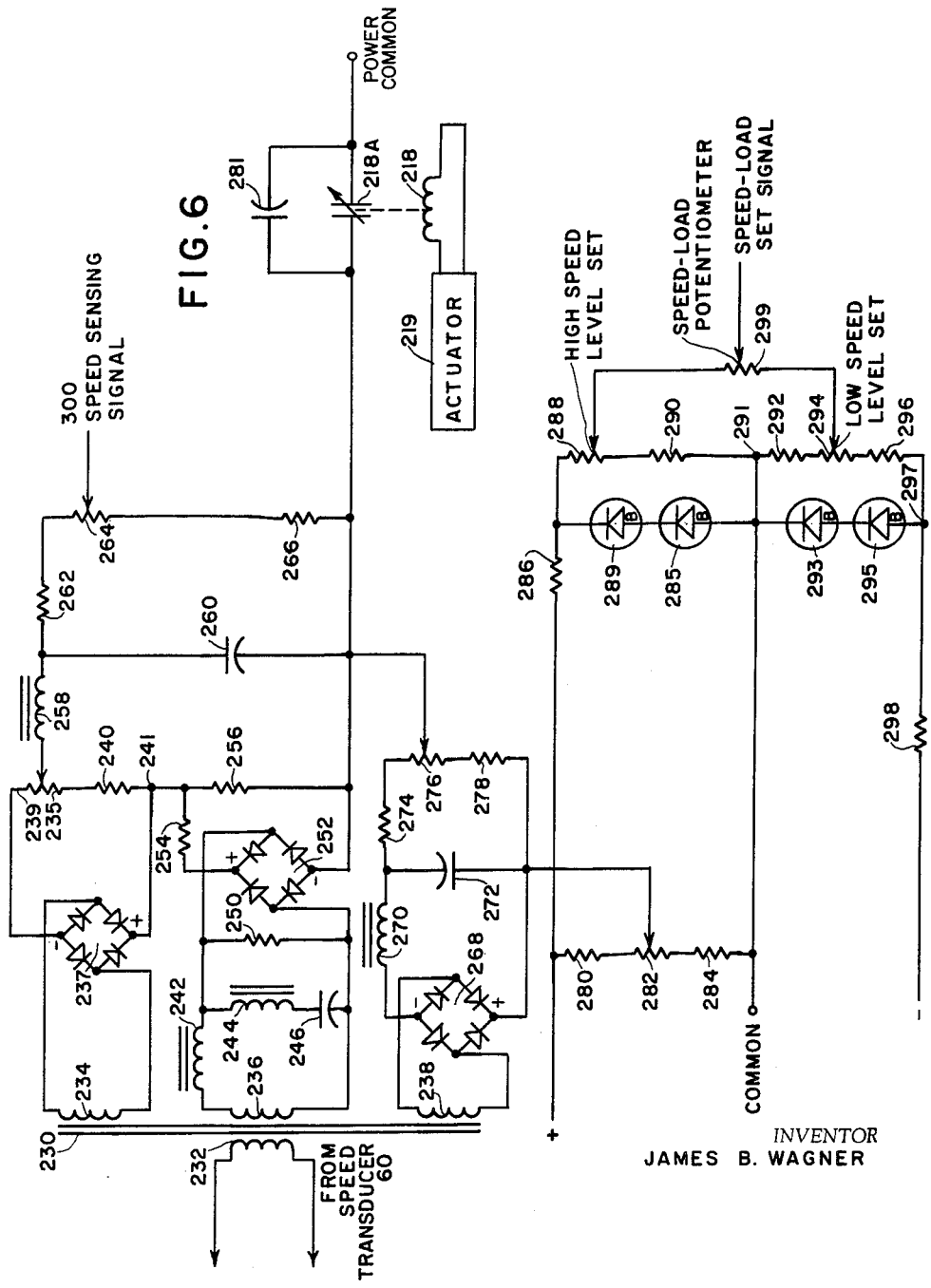

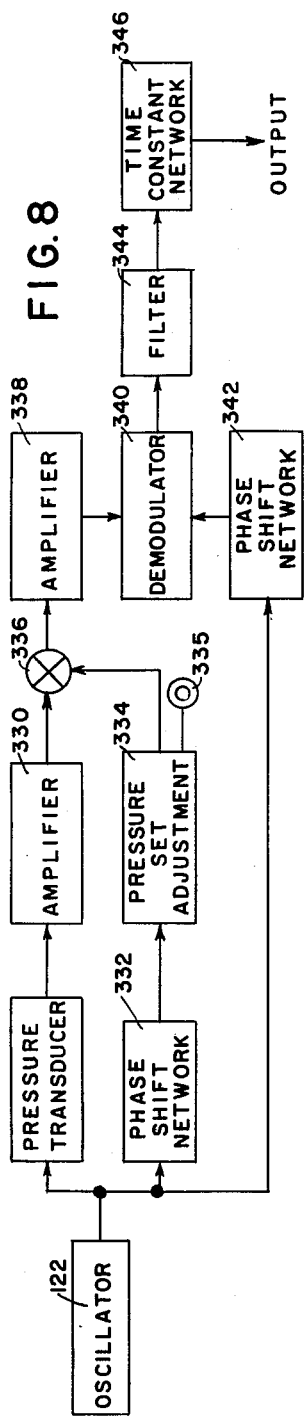
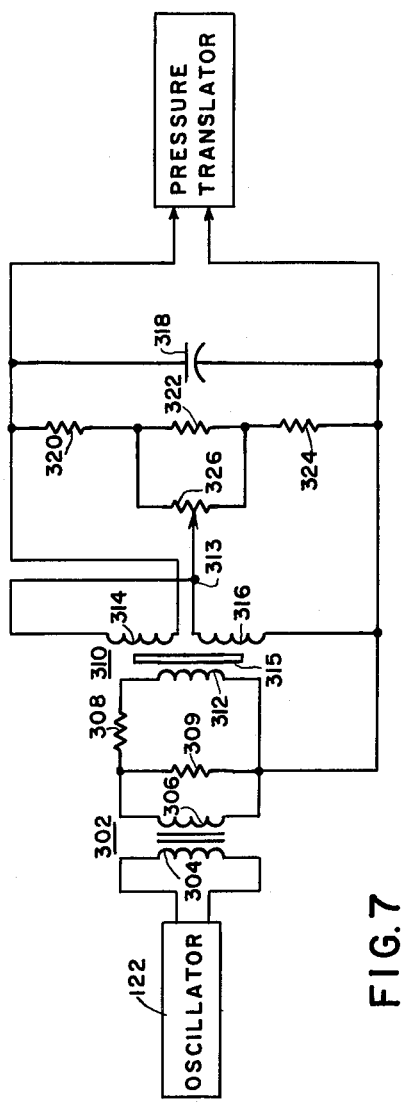

INVENTOR.
JAMES B. WAGNER

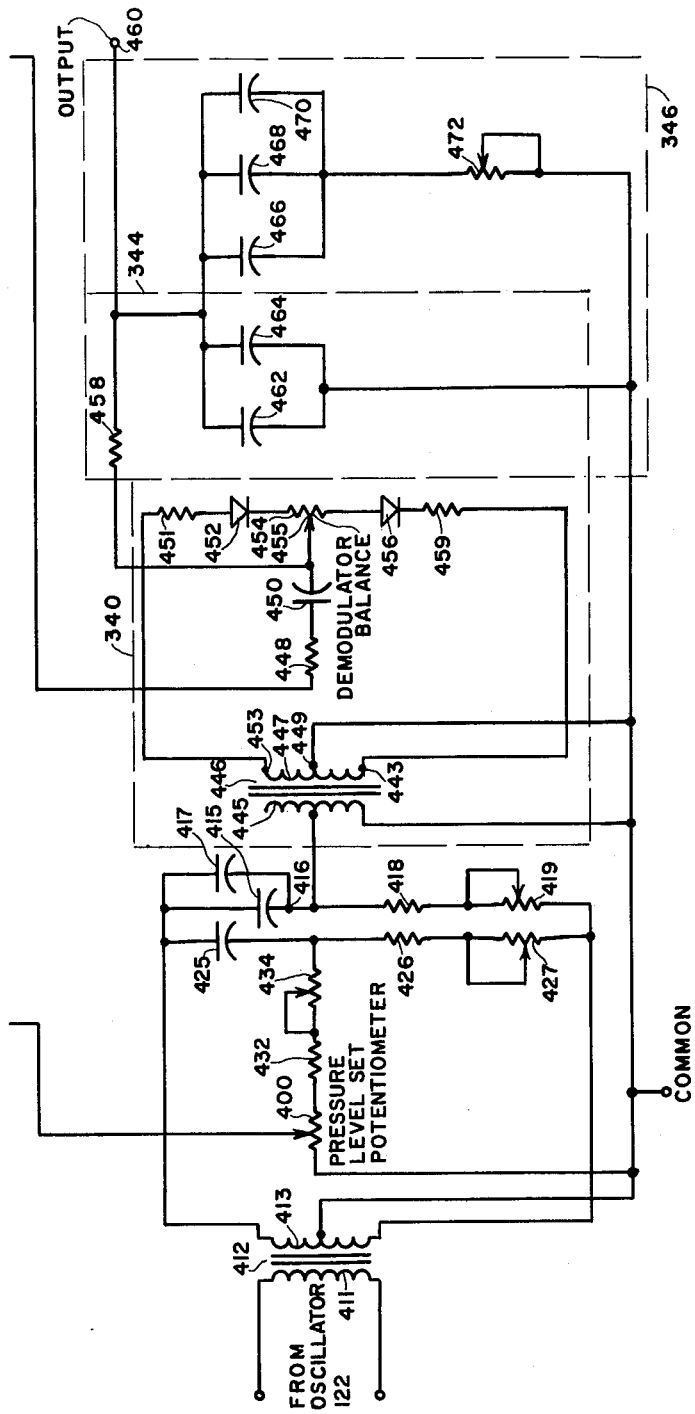

Feb. 8, 1966  J. B. WAGNER  3,233,412
CONTROL SYSTEM
Filed Nov. 12, 1963  13 Sheets-Sheet 9
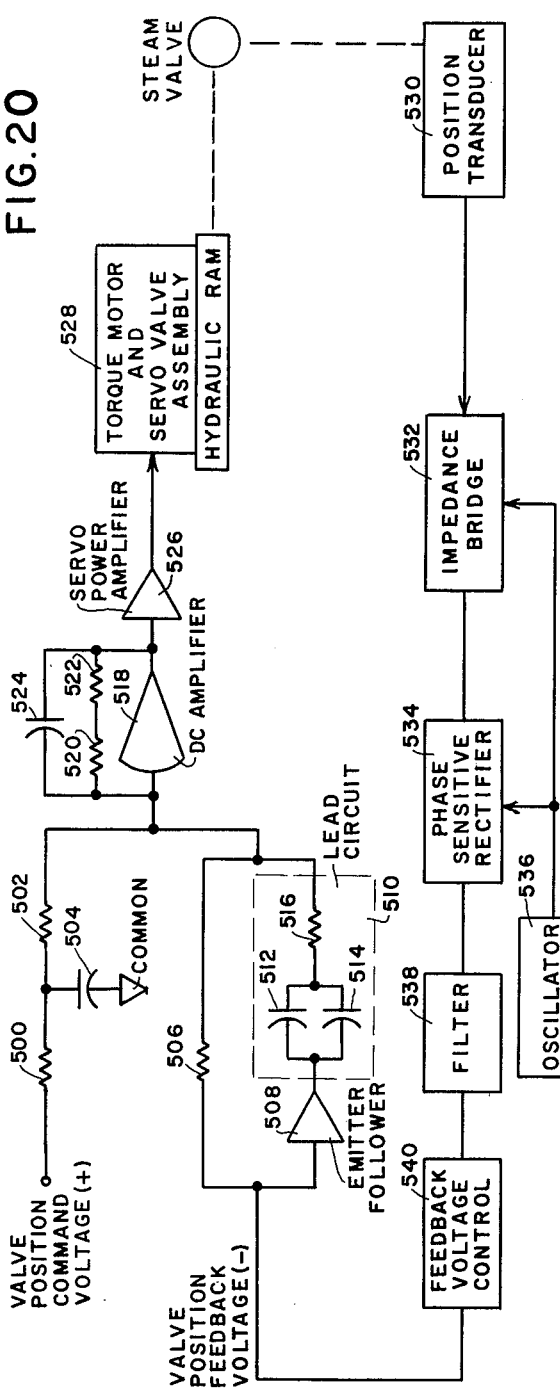
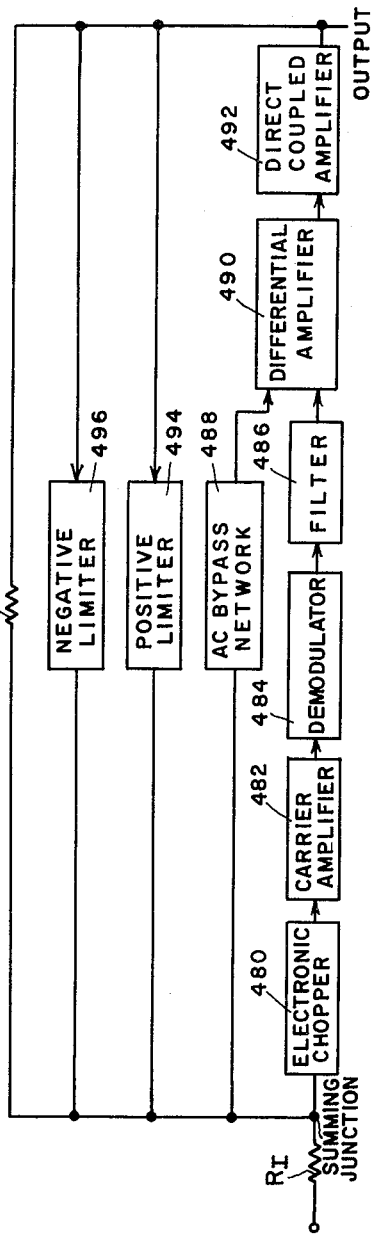
*INVENTOR*
JAMES B. WAGNER Feb. 8, 1966  J. B. WAGNER  3,233,412
CONTROL SYSTEM Filed Nov. 12, 1963  13 Sheets-Sheet 11

*INVENTOR*
JAMES B. WAGNER

Feb. 8, 1966   J. B. WAGNER   3,233,412
CONTROL SYSTEM
Filed Nov. 12, 1963   13 Sheets-Sheet 12
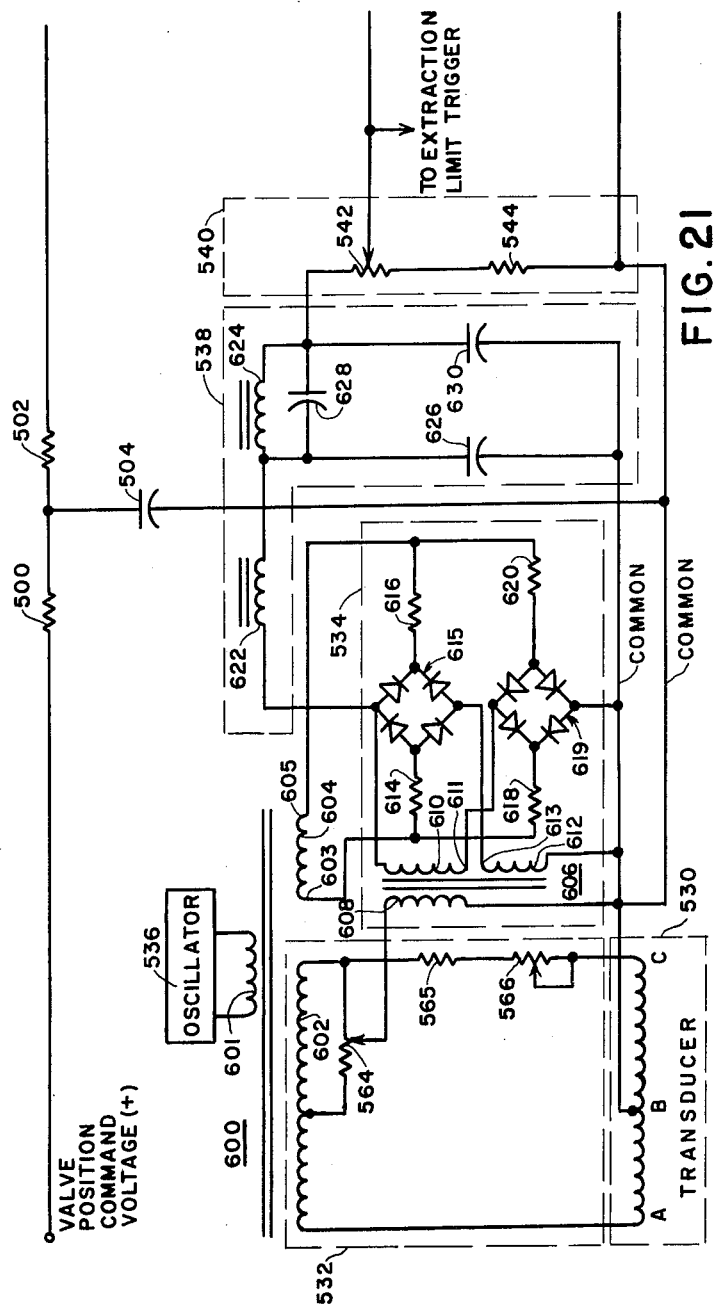
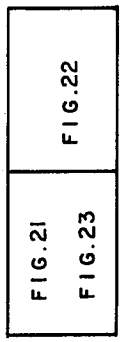
INVENTOR
JAMES B. WAGNER

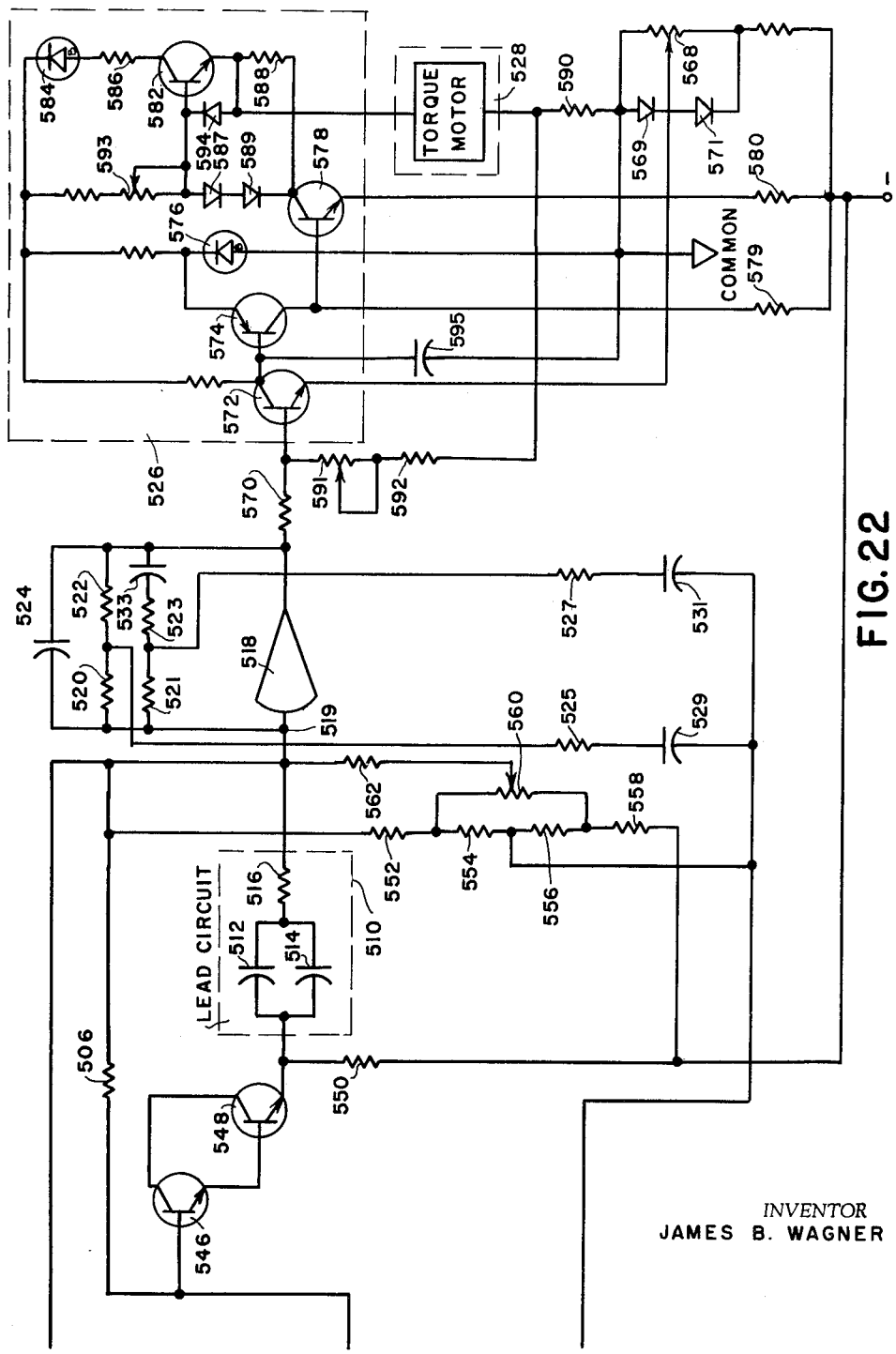

United States Patent Office 3,233,412
Patented Feb. 8, 1966

3,233,412
CONTROL SYSTEM
James B. Wagner, Lynnfield, Mass., assignor to General Electric Company, a corporation of New York
Filed Nov. 12, 1963, Ser. No. 323,161
5 Claims. (Cl. 60—67)

This invention relates to control systems for elastic fluid turbines. More particularly, it relates to an electrical control system capable of automatically controlling a multi-turbine unit comprising a plurality of multi-stage elastic fluid turbines of the plural extraction and mixed pressure type wherein one of the turbines is individually electrically controlled and the other turbines are individually mechanically controlled.

In multi-stage elastic fluid turbines of the type having a plurality of extraction conduits connected to a corresponding number of immediate stages thereof for removing fluid therefrom under different intermediate pressures respectively, each of the stages to which the extraction conduits are connected has an interstage valve arrangement. Such valve arrangement is operatively associated and cooperates with the inlet valves of the turbine and the valve arrangements of the other extraction conduits to maintain substantially constant the pressure of the fluid in the extraction conduits respectively connected to such stages. Ordinarily, the fluid used is steam and the steam extracted from the turbine through these conduits is employed for some useful purpose such as process steam, heating, etc. When conduits are connected to intermediate stages of the turbine respectively for the purpose of being supplied with fluid either from these intermediate stages or from an external source, in such case, the intermediate stages are termed mixed pressure stages. If only one conduit is connected to an intermediate stage comprising an interstage valve arrangement, then such turbine is generally designated as a single automatic extraction type turbine. An example of such single automatic type turbine is shown in Patent No. 2,977,768 and in Patent No. 3,091,933 of J. B. Wagner et al., both of these patents being assigned to the assignee of this application.

If two conduits are connected to two different intermediate stages, each of the stages comprising respective interstage valve arrangements, then such turbine is generally described as a double automatic extraction type turbine. An example of such double automatic extraction type turbine is disclosed in Patent No. 3,064,435 of Wagner et al., also assigned to the assignee of this application. If the exhaust steam provided through an exhaust conduit in either of the single or double automatic extraction type turbines are utilized for some useful purpose, then such turbine is generally described as a single or double automatic extraction non-condensing type turbine.

In the operation of the double automatic extraction condensing type turbine, the pressure in a first extraction conduit, i.e., the conduit proximal to the inlet valves, is greater than that in the second extraction conduit, the former being suitably designated as the high pressure conduit and the latter being designated as the low pressure conduit. The exhaust conduit in this type of turbine is, of course, distal to the low pressure conduit and the pressure of steam therein is lower than that in the low pressure conduit. In the operation of a single automatic extraction condensing type turbine, the pressure in the exhaust conduit is lower than that in the extraction conduit.

When steam is extracted from the two intermediate conduits of the double automatic extraction, condensing type turbine or of the intermediate conduit in the single automatic extraction condensing type turbine, it is desirable to control the regulation provided by the respective positions of the inlet valves and the interstage valves in such a manner that the speed of the turbine is maintained substantially constant irrespective of the changes in the load on the turbine and even though the requirements for extraction steam may vary considerably. Also, it is desirable to maintain pressure of the steam in the extraction conduits at respectively substantially constant values despite any changes in requirements for extraction steam and irrespective of changes in electrical load.

In the aforementioned U.S. Patents 3,091,933 and 3,064,435, there are shown and described electrical control systems for elastic fluid turbines of the automatic single and double extraction types respectively which are efficacious for dynamically controlling the positions of the inlet valves and the interstage valves in the turbine to effect the regulation of the speed of the turbine and the pressure in the extraction conduits.

Where the turbine is of the automatic extraction, non-condensing type, and it is desired to utilize the steam in the exhaust conduit for a useful purpose but it is not desired to regulate the pressure in the exhaust conduit, then speed and conduit pressure control may also be effected to maintain substantially constant, turbine speed, irrespective of changes in the load and the varying of the requirements of extraction conduit steam.

However, where in the automatic extraction type turbines, it is also desired to regulate the pressure in the exhaust conduit, then, the local turbine is either directly connected to the distribution line of a utility network or is connected into the distribution line through the common load bus of a parallel arrangement of a plurality of turbines. In a parallel arrangement, the local turbine generator combination is connected to the load bus through a generator breaker and the load bus is connected to utility network distribution line through a tie line breaker. In a parallel arrangement and/or a utility network tie-in, frequency control of the local turbine generator is maintained by the arrangement and/or the network. Thus, parallel operation permits exhaust pressure control wherein the fluid flow through the turbine can be controlled to maintain exhaust conduit pressure with a resultant change in real power developed by the turbine generator without a consequent change in system frequency.

In the patent application of Wagner et al. Serial No. 289,477, filed June 21, 1963, there is disclosed an electrical control system for a double automatic extraction non-condensing type turbine wherein pressure in the exhaust conduit may be controlled in cooperation with the control of the speed and extraction pressure variables of the system. In the control system of this application, there is also disclosed means wherein isochronous operation of the turbine generator is assured when a local turbine generator or a local parallel arrangement of turbines are the sources of power.

With the enabling of automatic electric control of turbines being made possible by the electrical control systems for automatic extraction type turbines as disclosed in the aforesaid Wagner et al. patents and application, the need has risen for the electrically controlling of extraction and exhaust pressures in a multi-unit system comprising a plurality of automatic extraction type turbines wherein one of the turbines has associated therewith an electrical control system as disclosed in the aforementioned patents and application and wherein the other of the turbines of the system are of the conventional mechanically controlled automatic extraction type. With this type of multi-unit electrical control, there would be enabled the integration of the operation of mixed multi-unit turbine systems and the centralized electric control of all of the turbines in the system. Consequently, there would be made possible a reduction in manpower with its resultant reduction in expense and a selection of more highly trained and competent control personnel. There would also be enabled the substantial elimination of human error.

Accordingly, it is an important object of this invention to provide an electrical control system for dynamically intercontrolling speed, extraction and exhaust pressures in a multi-unit turbine system wherein the turbines comprising the latter system are of the automatic extraction type and wherein at least one of the turbines of the multi-unit system is one that has associated therewith an electrical control system in which the speed of its turbine shaft and the pressure in its extraction and exhaust conduits are controlled and wherein the other turbines of the multi-unit system are automatic extraction type turbines in which their speed and pressure in their extraction and exhaust conduits are mechanically controlled.

Generally speaking and in accordance with the invention, there is provided an electrical control system for a multi-turbine arrangement which comprises a plurality of automatic extraction type turbines, each of the turbines respectively having inlet valve means governing the flow of fluid into a turbine, extraction conduits connected to intermediate stages of the turbine, and an exhaust conduit, interstage valve means governing the portion of fluid which flows through the extraction conduits, a plurality of extraction headers, each of the headers being common to all of the turbines for providing extraction fluid at chosen discrete pressure levels, and an exhaust header for providing exhaust fluid at a substantially chosen level. At least one of the turbines is adapted to be the master turbine of the arrangement and automatically, electrically controlled, the other of the turbines each have associated therewith mechanical control means for controlling the positions of their respective inlet and interstage valve means. The electrical control system controls the positions of the inlet and extraction valve means of the one turbine and actuates the mechanical control means of the other turbines to thereby control the speeds of all of the turbines while maintaining a predetermined share of the electrical load of the arrangement distributed between the turbines and maintains the pressures in the aforesaid headers at their chosen levels while maintaining the aforesaid predetermined share of the fluid provided for the headers distributed between the turbines. The electrical control system comprises first means responsive to speed of the master turbine for generating a first signal which is a function of this speed, second means responsive to the pressure in the exhaust header for generating a second signal which is a function of the pressure in the exhaust header, means in circuit with the first and second signal generating means for modifying the first signal with the second signal to produce a first resultant signal which is a function of the speed of the master turbine and the pressure in the exhaust header, and third means responsive to the pressures in the extraction conduits for generating third signals which are functions of the respective pressures in the extraction headers. Also included are means in circuit with the generating means for modifying the first resultant signal with the third signals and for modifying each of the third signals with the first resultant signal, and the others of the third signals, a first network controlled by the modified first resultant signal for governing the position of the inlet valve means of the master turbine and second networks controlled by the modified third signals for governing the positions of the extraction valve means of the master turbine. Also included are means for slaving the mechanically controlled turbines to the master turbine. The slaving means comprises means for producing first reference voltages which respectively represent given fractions of the exhaust header fluid flow and of the electrical load of the arrangement for each of the slaved turbines, and means for producing second reference voltages representing selected fractions respectively of extraction headers fluid flow for each of the slave turbines. There are provided means respectively responsive to the application thereto of the first reference voltages and the second signal for producing modified first voltages and means respectively responsive to the application thereto of the second reference voltages and the third signals for producing modified second voltages. The modified first voltages are respectively applied to first transducers which produce a mechanical output in response to an electrical input thereto, the outputs of the first transducers being applied respectively to the mechanical controls of the inlet valves of the slave turbines. The second modified voltages are applied to similar type mechanical output second transducers, the outputs of the second transducers being applied to the mechanical controls for the extraction valve means of the slave turbines. With this arrangement, accordingly, there are continually maintained electrical load sharing and exhaust header fluid flow between the turbines in accordance with the aforesaid given fractions and extraction header fluid flow between the turbines in accordance with the aforesaid selected fractions.

The novel features of this invention which are believed to be new are set forth with particularity in the appended claims, the invention itself, however, may best be understood by reference to the following description when taken in conjunction with the accompanying drawings which show an embodiment of a control system in accordance with the invention.

In the drawings, FIGS. 1 and 2 taken together as in FIG. 3 is a block diagram of the control system of the invention;

FIG. 6 is a schematic depiction of a circuit represented by the block diagram of FIG. 5;

FIG. 7 is a schematic diagram of an arrangement suitable for use as the pressure transducers in the system of FIGS. 1–3;

FIG. 8 is a block diagram of a circuit suitable for use as the pressure translators in the system of FIGS. 1–3;

Figure 1:
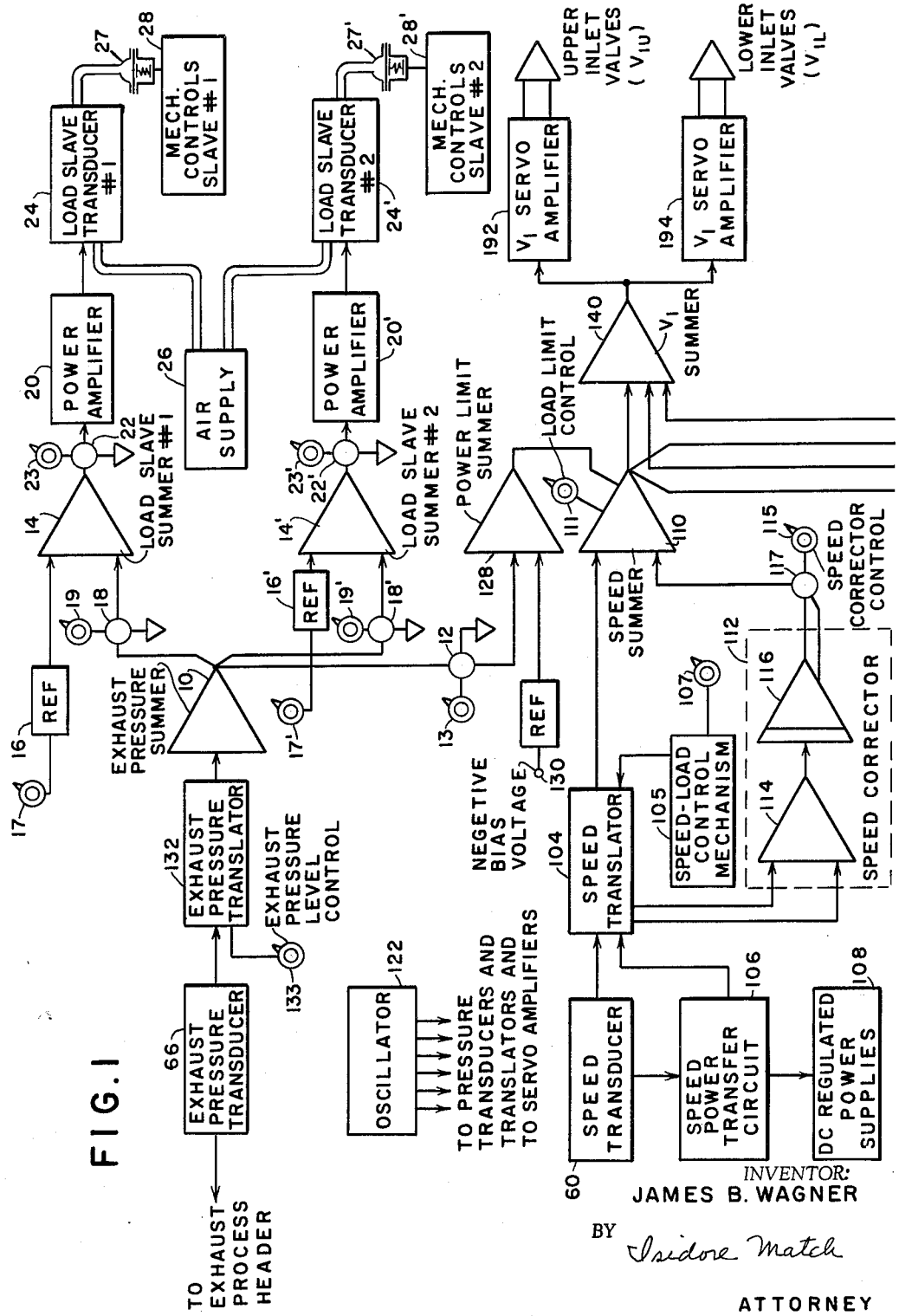
Figure 12:
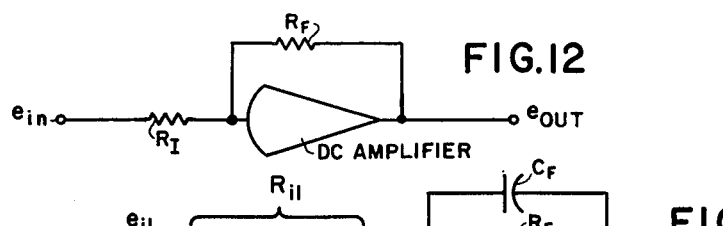
Figure 13:
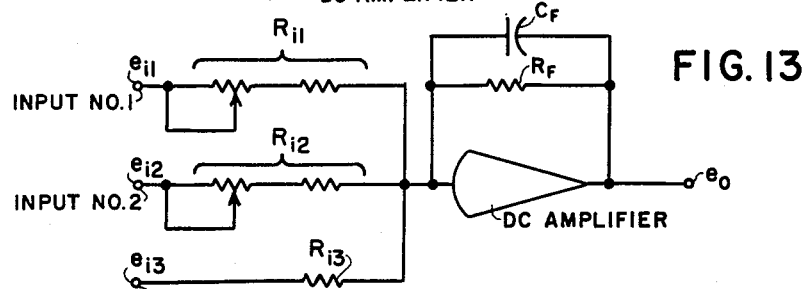
Figure 9:
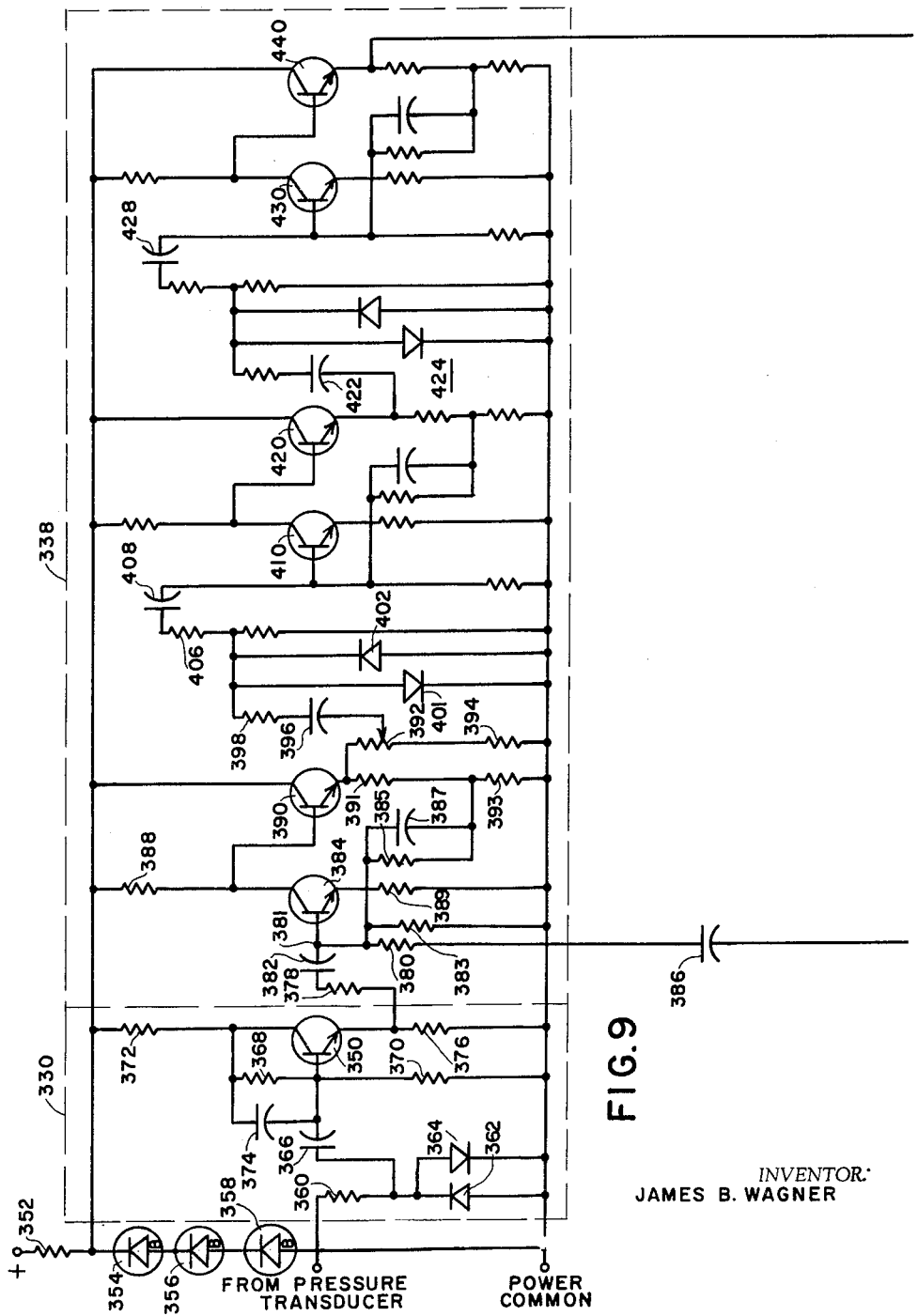
Figure 16:
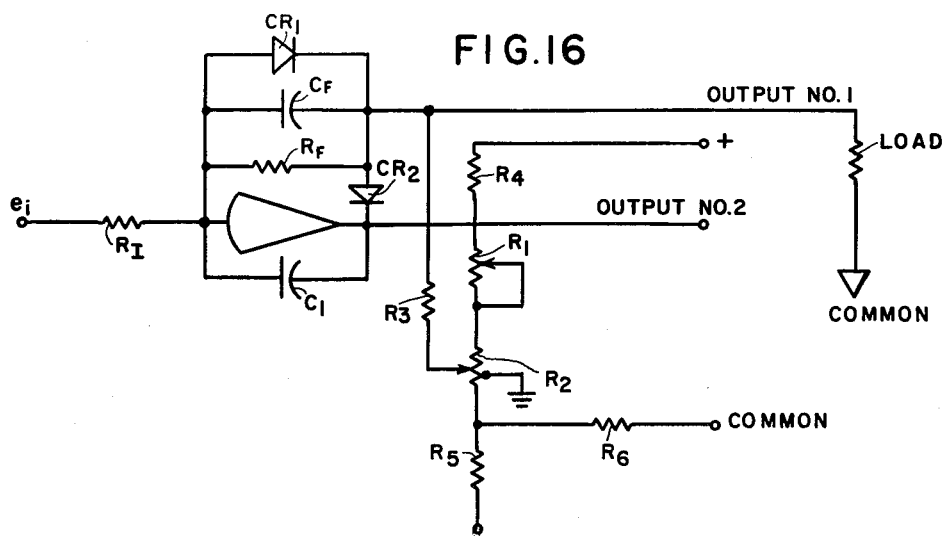
Figure 15:
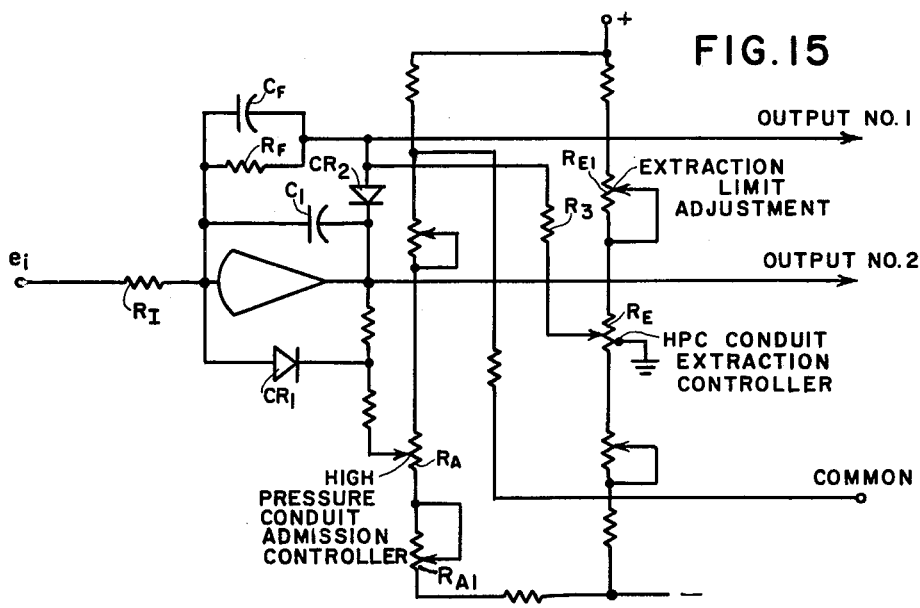
Figure 17:
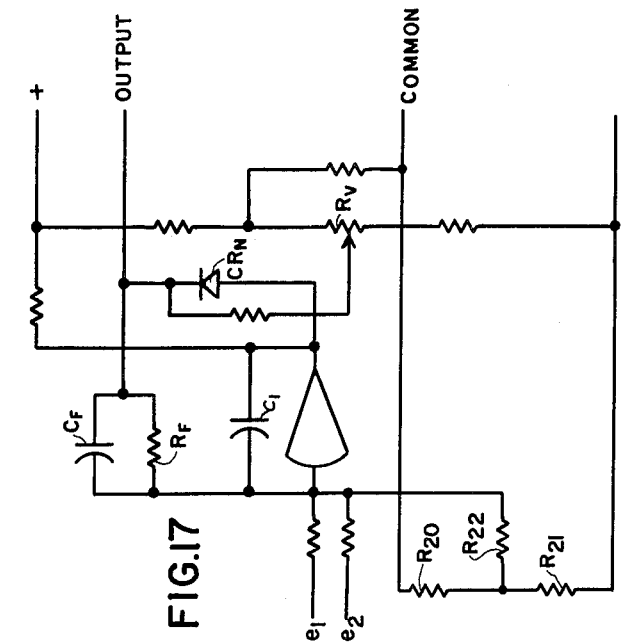
Figure 19:
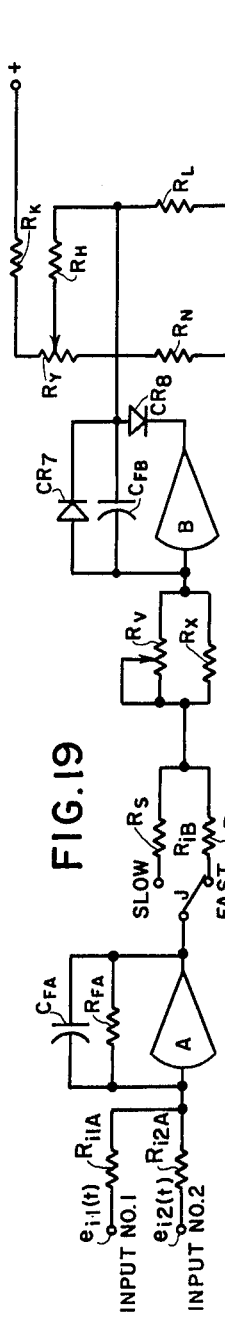
Figure 18:
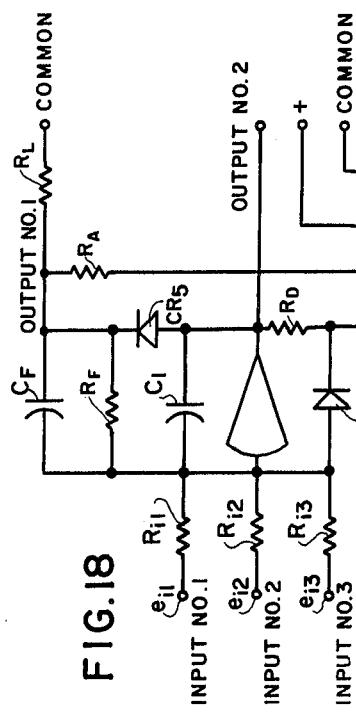

FIGS. 9 and 10 taken together as in FIG. 11 is a schematic diagram of a circuit represented by the block diagram of FIG. 8;

FIG. 12 is a diagram of an operational summing amplifier suitably utilized in the system of this invention;

FIG. 13 is a block diagram of a two input summer which is suitable for use as the slave summers of the system of FIGS. 1–3;

FIG. 14 is a block diagram of a D.C. amplifier suitable for use in the summers employed in the system of FIGS. 1–3;

FIG. 15 is a diagram of a one-input summer with a variable positive series voltage limiter and a variable negative feedback voltage limiter which is suitable for use as the high pressure conduit extraction pressure summer of the system of FIGS. 1–3;

FIG. 16 is a diagram of a one input summer with a variable positive voltage limiter and a fixed negative voltage limiter which is suitable for use as the low pressure conduit extraction pressure summer of the system of FIGS. 1–3;

FIG. 17 is a diagram of a three-input summer with a variable negative series voltage limiter and a variable negative voltage limiter controllable by an external voltage source suitable for use as the speed summer of the system of FIGS. 1–3;

FIG. 18 is a diagram of a summer suitable for use as the power limit summer of the system of FIGS. 1–3;

FIG. 19 is a diagram of a two-input summer and integrator suitable for use as the speed corrector stage of the system of FIGS. 1–3;

FIG. 20 is a block diagram of a servo amplifier suitable for use in the system of FIGS. 1–3; and FIGS. 21 and 22 taken together as in FIG. 23 is a schematic diagram of a circuit represented by the block diagram of FIG. 20.

In FIGS. 1 to 3, there are shown in block form, an illustrated embodiment of a control system constructed in accordance with the principles of the invention. The system of these figures is one which is utilized with a multi-unit turbine arrangement wherein one of the turbines, suitably designated as the "master" turbine, is adapted to have the positions of its inlet and extraction valves controlled by the electrical control system. The master turbine of the illustrative embodiment is chosen, for convenience, to be of the double automatic extraction non-condensing type, i.e., where the position of its inlet valves, high pressure and low pressure conduit extraction valves are controlled and where its exhaust conduit pressure may also be controlled. The other turbines of the multi-unit arrangement controlled by the system of FIGS. 1–3 may be of the single or double automatic extraction, condensing or non-condensing type, which have associated therewith mechanical valve position governing controls.

The control system of FIGS. 1–3 enables the initial assigning of selected fractions of the electrical load to the turbines respectively, the sharing of extraction and exhaust process steam in chosen ratios by the turbine, and the continual maintaining of these shares and ratios with changes in electrical load and demand for process steam.

In addition, the system enables the control of extraction and exhaust pressures in the system. Since the illustrative embodiment is one which can control two pressure levels of extraction steam and the pressure level of exhaust steam, it is adaptable in a multi-unit turbine arrangement in which there is provided a high extraction pressure steam header common to all of the turbines, a low extraction pressure steam header common to all of the turbines and an exhaust steam header common to all of the turbines. Of course, only the master turbine, i.e., the electrically controlled one, need be of the double automatic extraction, non-condensing type. The mechanically controlled ones may be of the single or double automatic extraction non-condensing or condensing type.

In considering the control system of FIGS. 1 to 3, the rotary motion of the shaft of the master turbine is applied to a speed transducer 60, suitably a permanent magnet generator, which serves to provide an electrical signal whose amplitude and frequency are functions of the speed of the shaft. The pressure in the high pressure process header of the multi-unit turbine arrangement is transmitted by means of a pipe (not shown), to a pressure transducer 62 which provides an electric signal that is a function of the pressure in the high pressure process header. The pressure in the low pressure process header is transmitted by means of a pipe (not shown) to a pressure tranducer 64 which provides an electrical signal which is a function of the pressure in the low pressure process header. The pressure in the exhaust process header is transmitted by a pipe (not shown) to a pressure transducer 66 which provides an electric signal which is a function of the pressure in the exhaust process header.

The output of speed transducer 60 is a sinusoidal voltage having an amplitude and frequency proportional to speed. Transducer 60 may suitably be a permanent magnet generator of the type well known in the art. For example, in the event that there is utilized a fourteen pole permanent magnet generator, i.e., comprising seven pairs of poles, the frequency of this sinusoidal output is seven times the revolutions per second of the turbine shaft. Thus, with a shaft speed of 3600 revolutions per minute, i.e., 60 revolutions per second, speed transducer 60 may provide a sinusoidal output having a frequency of 420 cycles per second. The output from speed tranducer 60 supplied as an input both to a speed translator stage 104 and to a speed power transfer circuit 106.

Speed power transfer circuit 106 functions to enable the utilization of the readily available A.C. line voltage for initially actuating the electrical system in the event that turbine shaft rotation is not occurring in the master turbine. Stage 106 itself may be powered by an A.C. voltage having a 60 cycle per second frequency. Of course, when turbine shaft rotation is occurring in the master turbine, the voltage output from speed transducer 60 is utilized to produce the supply voltage for the components of the control system of FIGS. 1 to 3. Speed power transfer circuit 106 may suitably be one such as is shown in FIG. 6 of the aforesaid J. B. Wagner et al., Patent 3,064,435.

It is seen that the output of speed power transfer circuit 106 is applied as the supply voltage to a stage 108 which provides a positive regulated voltage supply, such supply suitably having a value of +30 volts, and which provides a regulated negative voltage supply which may have a value such as about −16 volts, these regulated voltages being the unidirectional supply voltages for the components of the control system.

Figure 5:
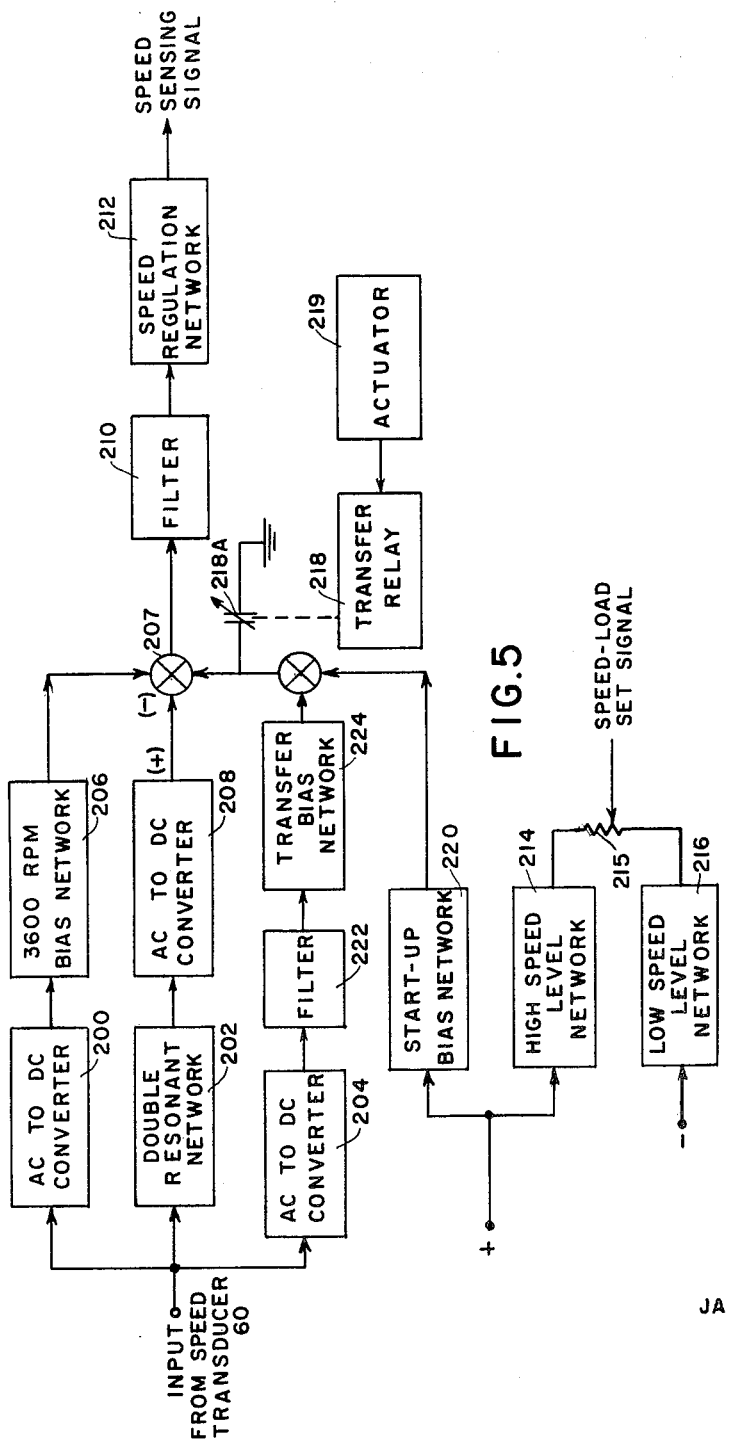
FIG. 5 is a block diagram of a circuit suitable for use as the speed translator in the system of FIGS. 1–3.

Speed translator stage 104, a suitable example of which is shown in FIGS. 5 and 6, to which the output of speed transducer 60 is applied, operates to produce a direct current output voltage, i.e., a speed sensing signal, whose amplitude and polarity are proportional to the instantaneous deviation of the frequency of the alternating current input voltage thereto from a preset reference value of frequency. This D.C. output voltage suitably can be modified by an arrangement such as a relay circuit, which in response to an externally applied direct current voltage applied thereto provides a positive direct current voltage output of a preset magnitude to furnish start-up bias voltage for the control system for that condition of operation where the alternating current voltage input has a zero frequency value. Contained in speed translator stage 104 is means such as a variable resistor, for example, which enables the selection of a maximum reference voltage level to provide a maximum speed level for the turbine shaft of the master turbine under no load conditions. As shown in FIGS. 5 and 6, this voltage level moves in the negative direction with increasing speed.

The stage 105 legended speed-load control mechanism essentially enables speed translator stage 104 to provide an additional function in producing a second direct current output voltage signal and to this end contains a potentiometer whose setting can be controlled externally, such as by a potentiometer control knob 107. Speed-load control mechanism stage 105 functions to enable the selection of a voltage level about which variations of turbine speed are referenced. As shown in FIGS. 5 and 6, this signal voltage may be chosen to be positive.

As will be further shown hereinbelow, the direct current signal voltages produced by speed translator stage 104 have a magnitude which influence the turbine steam valve positions in the master turbine in response to changes in existing turbine speed or load from a desired value. Thus, the manually adjustable output voltage from the speed translator stage 104 as enabled by speed load control mechanism stage 105 sets the desired turbine speed or load, such voltage conveniently being designated as the speed-load set signal. The other output voltage from the speed translator 104 is a measure of a change in existing turbine speed from the rated synchronized turbine speed, the afore-designated speed sensing signal. As has been stated hereinabove, this speed sensing signal may be changed from zero at very low turbine speeds to insure that the proper steam valve positions can be obtained to start the master turbine under all operating conditions, a start-up bias network being included in speed translator stage 104 to perform this function.

The speed sensing output signal of speed translator stage 104 is applied as one input to a summer 110 legended speed summer, a suitable example of which is shown in FIG. 17, and as a first input to a speed corrector stage 112, a suitable example of which is shown in FIG. 9. Speed summer 110 and the other summers in the system of this invention may suitably be inverting operational amplifiers arranged to function as adders or may be passive resistance network adders which are respectively operatively associated with the D.C. amplifiers which invert the input applied thereto. The speed-load set signal output of speed translator stage 104 is applied as the second input to speed corrector stage 112.

Speed corrector stage 112 which comprises a summer stage 114 and an integrator 116 in cascade arrangement functions to produce isochronous operation of the arrangement when it is a local turbine generating system. Speed corrector stage 112 is not used when the frequency of the local generating system is being controlled by frequency controlling apparatus included in a multiple turbine-generating system tied into a utility network. Associated with speed corrector stage 112 is a potentiometer 117 externally controllable by a knob 115. Potentiometer 117 is utilized only in an "in" and "out" position and enables the smooth insertion or removal of speed corrector stage 112 from service.

In considering the operation of speed corrector stage 112, let the condition be assumed where it is out of service. In such situation, there is applied to speed summer 110 only the speed sensing and speed-load set signals and the summed output of speed summer 110 is a D.C. signal which reflects the addition of the speed sensing signal to the speed-load set signal. Consequently, the speed-load set signal establishes the generated kilowatt power level for the master turbine since the larger such signal is, the further its inlet valves will open and, consequently, the larger the load. Speed summer 110 functions to compare these two signals and the D.C. output of speed summer 110 varies about the reference level established by the speed-load set signal as dictated by changes in the master turbine shaft speed. Consequently, with a chosen setting of the speed-load control potentiometer, speed will change only with a change in load.

The purpose of speed corrector stage 112 is to automatically maintain electrical system frequency at a constant preset value. This maintaining can be accomplished by continually adjusting the generated power to match exactly that of the load at a given frequency. Thus, considering the situation where speed corrector stage 112 is in service, it operates to compare the speed sensing signal with the speed-load set signal. When the difference between the two compared signal levels is zero, the master turbine speed is the desired one and the output voltage of speed corrector stage 112 applied to speed summer 110 remains unchanged. However, should the electrical load change, the difference between the two signal levels would no longer be zero and there would result a difference or "error" signal. The electrical sign associated with this error signal indicates whether instantaneous speed is too high or too low. With the sign convention wherein an increase in speed provides a negative increment of output voltage from speed translator 104, a positive output from speed corrector 112 would indicate too low a speed and a negative output would indicate too high a speed. The speed corrector error signal as produced at the output of summer 114 is the inversion of the sum of the speed sensing and speed-load set signal outputs from speed translator 104. The output of summer 114 is continuously monitored by integrator 116 which re-inverts the input thereto. Consequently, the output of speed corrector 112 is in phase with its input and is in the direction to increase the output signal voltage level of speed summer 110 in the negative direction if the speed is too low and to effect the reverse if the speed is too high. It is, of course, to be realized that the output of integrator 116 is a signal which is the time integrated value of the deviation from desired speed.

The exhaust pressure regulating channel which comprises a transducer 66 and an exhaust pressure translator 132 is utilized for controlling the pressure in the exhaust process header when the multi-turbine unit arrangement is tied in with other systems into a utility network capable of maintaining frequency control of its component turbine generating units. In such latter situation, speed control in the local arrangement is maintained by the frequency control arrangement in the system and the steam control valves in the local arrangement are permitted the freedom to establish the exhaust process header pressure by changing its generated load as required.

To bring the exhaust pressure regulating channel into service, speed corrector stage 112 has to be placed out of services by the rotation of knob 115 to the OUT position.

An exhaust pressure conduit level set potentiometer externally controllable by a knob 133 is included in exhaust pressure translator 132 to provide a chosen reference level which represents an exhaust pressure level at which it is desired that the arrangement operate.

The output of exhaust pressure translator 132 in accordance with the adopted sign conventions of the system of FIGS. 1-3 is chosen to be a voltage which provides a positive increment of D.C. voltage with a fall in exhaust pressure and is applied as an input to an exhaust pressure summer stage 10 which inverts the input thereto. The output of pressure summer 10 is applied as an input to power limit summer 128 through an exhaust pressure control potentiometer 12 which is externally controllable by a knob 13.

With a fall in exhaust pressure, the positively decreasing voltage signal applied to power limit summer 128 through potentiometer 12 is inverted by summer 128 to inject a positively increasing voltage into the output of speed summer 110. This can be understood when it is realized that the output of exhaust translator 132 bucks the negative bias voltage 130 input into summer 128. A positively increasing voltage from translator 132 has less subtracting effect on bias voltage 130 whereby the output of power limit summer 128 is a positively increasing voltage. This, of course, in accordance with the operation of speed summer 110, tends to make its output more negative and indicates a command for a greater opening of the inlet valves.

The operation of speed summer 110 can now be understood. It is realized that the output of speed summer 110 will be the contribution of the speed regulating channel to the control of the inlet valves of the electrically controlled turbine, i.e., the master turbine in the arrangement, by the exhaust pressure regulating channel. As will be shown hereinbelow, the output of $V_1$ summer 140 which is the command voltage for the position of the inlet valves in the master turbine, in accordance with the sign conventions adopted in the system of FIGS. 1-3, has to be increased in the positive direction to call for a further opening of its inlet valves and to be incrementally decreased to call for a closing of its inlet valves. As will be seen hereinbelow, this sign convention is also utilized with the extraction conduit valves of the master turbine so that a positively incrementally increasing voltage commands a further opening thereof and an incrementally decreasing voltage commands a further closing thereof. Since the summers of the system are chosen to have inverting D.C. amplifiers contained therein, an incrementally decreasing output from speed summer 110 consequently calls for a further opening of the inlet valves.

Contained in speed summer 110 is a potentiometer externally controllable by knob 111, the setting on this potentiometer effecting a negative limit to the output of summer 110, such negative limit representing a chosen maximum load. Thus, no matter what the value of the resultant from the summing of the inputs to speed summer 110 is, its output cannot exceed this negative limit. Consequently, the potentiometer controlled by knob 111 effects a ceiling control of the output of speed summer 110.

In an arrangement where the multi-unit turbine arrangement is a local system, speed corrector 112, as has been previously described, functions to insure isochronous operation by comparing the speed sensing signal output of speed translator 104 with the speed-load set signal as provided by the speed load control mechanism 105. The time integrated difference between these signals applied as an input to speed summer 110 provides a constant monitor of the speed of the master turbine, and accordingly, is that component in the output of speed summer 110 which insures constant speed therein.

As will be further explained, the summers which produce the command voltages for the valve systems of the master turbine, viz., $V_1$ summer 140 for the inlet valves, $V_2$ summer 160 for the high pressure extraction conduit valves and $V_3$ summer 180 for the low pressure extraction conduit valves, all produce outputs which reflect the synthesis of speed regulation and high pressure conduit and low pressure conduit extraction pressure regulation signals. Thus, there also is provided in the system of FIGS. 1 to 3, a high pressure conduit extraction pressure regulating channel and a low pressure conduit extraction pressure regulating channel.

In the high pressure conduit extraction pressure regulating channel, there is provided a transducer 62 which is similar in structure and operation to exhaust pressure transducer 66 and which senses the pressure in the high pressure process header. The output of transducer 62 is applied to a high pressure conduit extraction and admission pressure translator 142, translator 142 being similar to exhaust pressure translator 132 and, similar to it, also containing a potentiometer therein, controllable externally by knob 143, the setting on the latter potentiometer determining the extraction pressure level in the high pressure process header at which it is desired that the multi-unit arrangement operate.

It is seen that the output of high pressure process header translator 142 is applied to the $V_1$ summer through two inverting amplifiers, viz., those contained in high pressure extraction pressure summer 144 and a one input inverting summer 146.

The output of high pressure process header translator 142 is applied as an input to the $V_2$ summer through one inverting amplifier, i.e., that contained in high pressure extraction pressure summer 144, and is also applied as an input to the $V_3$ 180 summer through summer 144. Thus, in the event that pressure in the high pressure process header decreases, a further closing of the high pressure conduit valves in the master turbine is called for whereby the input to $V_2$ summer 160 reflecting the pressure in the high pressure header has to be positive and, assuming that the electrical load is at the desired level, the input to $V_1$ summer 140 reflecting the high pressure process header control has to be negative to insert a component in the output of $V_1$ summer 140 which calls for a further opening of the inlet valves. Consequently, the circuit components in translator 142 are so arranged whereby a decrease in extraction pressure in the high pressure process header produces a negative increment of voltage output therefrom and an increase in pressure therein produces a positive increment.

In the high pressure process header control channel, transducer 62 has its output balanced to a null voltage, such null or zero voltage being obtained at the highest pressure process header extraction pressure that it is desired that the system operate at. The potentiometer externally controllable by knob 143 in high pressure translator 142 provides a chosen reference voltage level which represents a pressure level for which it is desired that the arrangement operate at. Such latter pressure cannot exceed the null level initially chosen.

The output of translator 142 is applied as an input to high pressure extraction pressure summer 144. Summer 144 suitably may be a one input summer including a variable positive series voltage limiter and a variable negative feedback voltage limiter as shown in FIG. 15 and may be utilized where extraction pressure and admission pressure are controlled in the high pressure process header. To that end, potentiometers contained in summer 144 and externally controllable by knobs 145 and 147 respectively set flow limits for high extraction, and admission steam. The potentiometer controlled by knob 145 determines the positive voltage limit and accordingly controls the degree of closure permitted for the high pressure conduit valves of the master turbine when steam is extracted. The potentiometer controlled by knob 147 determines the negative voltage limit and accordingly controls the degree of opening permitted for the high pressure conduit valves in the master turbine when steam is admitted into the high pressure extraction conduit.

The low pressure process header extraction pressure regulating channel also includes a transducer 64 which is similar in structure and operation to the other pressure transducers in the system, the output of which is applied to a low pressure extraction pressure translator 162 which is similar to the other pressure translators of the system, transducer 64 being balanced to a null voltage at the highest desired operating pressure in the low pressure process header. As in the other pressure translators, translator 162 contains a potentiometer externally controllable by a knob 163 which sets the desired level of extraction pressure in the low pressure conduit. The output of low pressure extraction pressure translator 162 is applied to a low pressure extraction pressure summer 164 which is similar to summer 144 in the high pressure process header extraction pressure regulating channel. Thus, low pressure extraction pressure summer 164 may be a circuit as shown in FIG. 16 and which contains a variable positive series voltage limiter and a fixed negative feedback voltage limiter. The variable positive series voltage limiter includes a potentiometer externally controllable by a knob 165 which sets a positive limit on the output of summer 164 and thereby sets a maximum flow limit of extraction steam in the low pressure conduit of the master turbine. The negative voltage limit is utilized to prevent the low pressure control from attempting to admit steam into the low pressure extraction conduit of the master turbine. Since the signal representing the output of the low pressure regulating channel as produced by translator 162 has to be negative to call for a further opening of the inlet valves of the master turbine, a further opening of the high pressure conduit valves and a further closing of the low pressure conduit valves, the output of low pressure conduit extraction pressure translator 162 is chosen to be a negative increment of D.C. voltage with a decrease in pressure in the low pressure conduit and a positive increment when the reverse situation obtains. An inverting summer 182 provides the inversion of the output of summer 164 to produce the desired polarity inputs to $V_1$ summer 140 and $V_2$ summer 160.

Figure 4:
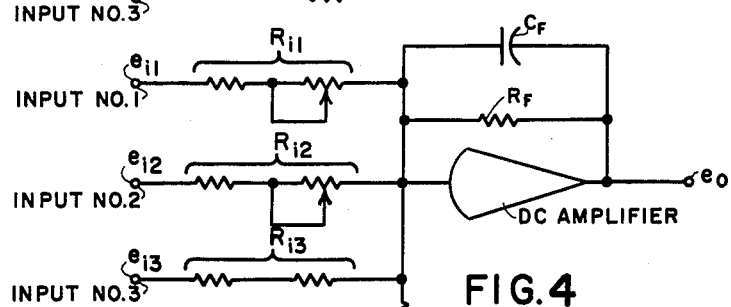
FIG. 4 is a block diagram of a three-input summer with an internal bias injector which is suitable for use as the valve position command voltage summers of the system of FIGS. 1–3.

Reference can now be made to the operation of $V_1$ summer 140, $V_2$ summer 160 and $V_3$ summer 180. suitable examples of which are shown in FIG. 4.

In this operation, the inputs to $V_1$ summer 140 which controls the position of the inlet valves in the master turbine is the output of speed summer 110, the output of high pressure extraction pressure summer 144 and the output of low pressure extraction pressure summer 164. If a further opening of the inlet valves is called for, the values of the circuit components of the system of FIGS. 1 to 3 are so chosen that the output of $V_1$ summer 140, is a positive signal, i.e., the resultant of the summing of the inputs to $V_1$ summer 140 is negative. If the high pressure conduit valves in the master turbine are commanded to open because of the pressure or load considerations, then the output of $V_2$ summer is positive, i.e., the resultant of the summing of the speed sensing, high and low pressure signals at the input to $V_2$ summer is negative. If a further opening of the low pressure conduit valves in the master turbine is called for, the input to $V_3$ summer 180 which is the resultant of the summing of the outputs of summers 110, 144 and 164 is negative to cause a further opening of these low pressure conduit extraction valves. Conversely, an opposite series of events correspondingly causes an opposite series of effects.

$V_2$ summer 160 and $V_3$ summer 180 each have included therein means for providing an adjustable bias voltage input thereto which represents an indexing or lead position for the stems of the high and low pressure conduit valve means respectively of the master turbine. The index positions of these valves respectively represent positions which cause them to be opened before the inlet valves of the master turbine as, the voltage from the speed summer is negatively incremented from its zero value. If such indexing were not made, there would be no complete path for steam to travel under startup conditions of the master turbine.

The output of $V_1$ summer 140 which produces the command voltage for controlling the position of the upper and lower inlet valves of the master turbine, the output of $V_2$ summer 160 which produces the command voltage for controlling the position of the high pressure conduit extraction valves and the output of $V_3$ summer 180 which produces the command voltage for controlling the position of the low pressure conduit extraction valves are each applied to like servo amplifiers 192, 194, 196 and 198, respectively, suitable examples of which are shown in FIGS. 20 to 23. In this connection, the output of $V_1$ summer 140 is applied to servo amplifiers 192 and 194 since the positions of both upper and lower inlet valves of the master turbine are being controlled. The function of each servo amplifier is to control an electro-hydraulically operated turbine steam valve by means of a positional servo system. To accomplish this control, the command voltage received by each servo amplifier is compared with a feedback voltage proportional to the actual valve position. The resultant error voltage, damped by the subtracting of a signal proportional to valve velocity from the resultant of the comparison, is amplified by an amplifier and this amplified output current controls a suitable device such as a torque motor and hydraulic servo valve assembly on the turbine. The servo valve assembly actuates a hydraulic ram which causes the movement of the stem valves. Allowance for a mechanical overtravel is provided in the valve positioning mechanism to insure that under all conditions the steam valves may be completely closed. Consequently, a small positive voltage source is provided for application to a servo amplifier which represents a resultant small motion in a hydraulic ram.

The servo amplifiers are included in the system of the invention to produce respective positions of valves of the master turbine substantially exactly proportional to the position represented by the respective outputs of the summers which produce the command voltages therefor substantially independent of reaction forces on the valves. It is readily appreciated that these reaction forces are quite great and may be in the order of many thousands of pounds. In addition, there may be regions of abrupt negative force gradients. The servo amplifiers insure accurate positioning of the valves substantially independent of the strength and nonlinearities of these reaction forces.

Thus far it has been shown in the system of FIGS. 1 to 3 as to how the valve positions of the master turbine, i.e., the electrically controlled turbine, of the multi-turbine unit arrangement are controlled in response to changes in speed, i.e., electrical load and changes in the high and low pressure process headers and in the exhaust process header. The remaining structure in the system of FIGS. 1 to 3 enable the slaving of the mechanically controlled other turbines of the arrangement to the electrically controlled master turbine to enable the initial assigning to each slave, i.e., mechanically controlled, turbine of a selected fraction of the electrical load, the providing of a selected fraction of the extraction and exhaust headers steam, and the sharing of changes in electrical load and process steam requirements between the turbines in accordance with these assigned fractions.

The system of FIGS. 1 to 3 is one adapted for use with a multi-turbine arrangement in which there is a master electrically controlled turbine and two slave mechanically controlled turbines. It is, of course, to be realized that such arrangement has been chosen for convenience of description and explanation of operation and that any number of mechanically controlled turbines may be slaved to the master turbine in accordance with the principles of the invention. It is further to be realized that the slave turbines need not be of the same type in the arrangement, i.e., they may be of the single and double automatic condensing or non-condensing type. For example, one of the slave turbines could be a mechanically controlled single automatic condensing type whereby it would merely handle its share of the electrical load and provide its shart of high pressure process steam. Another in the same arrangement might be a double automatic non-condensing type mechanically controlled turbine whereby it would handle its share of the electrical load and provide its share of high pressure, low pressure and exhaust steam.

Since the system of FIGS. 1 to 3 illustrates an arrangement which has two mechanically controlled slave turbines, each control channel, viz., exhaust, high extraction and low extraction has two slave sub-channels, each sub-channel being respectively associated with one of the slave turbines for the particular control function. Since these channels for each control function contain similar combinations of like structures and operate similarly, the corresponding structures in each of the channels have been given the same numerals, a differentiation being made therebetween by the use of the prime notation for one of the sub-channels. Only one sub-channel with respect to a variable being controlled is described as to its structure and operation.

Accordingly, with regard to electrical load sharing and to the sharing of changes in load in the multi-turbine unit arrangement, the output of exhaust pressure summer 10 is applied to a two input summer 14 legended load slave summer through an incremental load potentiometer 18 externally controllable by a knob 19. The other input to a summer 14 is a reference voltage 16 which may include a potentiometer that is externally controllable by a knob 17. The value chosen for the reference voltage input to summer 14 in combination with the value of the voltage of the output of exhaust pressure summer 10 initially represents a chosen load for slave turbine #1 and consequently a chosen total portion of a selected electrical load for the multi-turbine unit arrangement. Incremental load control potentiometer 18 permits the adjustment of the sharing of load changes between the master turbine and the slave turbine. Thus, as potentiometer 18 is rotated to increase the voltage applied therefrom to speed load slave summer 14, slave turbine #1 correspondingly assumes an increasingly larger share of subsequent load changes. It is recalled that the output of exhaust pressure summer 10 has to be negative in accordance with the sign conventions adopted in the system of FIGS. 1 to 3 to enable the handling of a larger electrical load, i.e., to cause a further opening of the inlet valves of the master turbine. Thus, if the electrical load on the arrangement increases, the incremental load signal applied to summer 14 increases in the negative direction. Accordingly, the base load control reference voltage input 16 to summer 14 is chosen to be negative, whereby when a load change is in the increasing direction, the output of summer 14 increases. The output of summer 14 is applied to a power amplifier 20 through a potentiometer 22 externally controllable by a knob 23. Potentiometer 22 is used only in an upper and lower position to bring the slave control and channel smoothly in and out of service.

The output of power amplifier 20 is applied to a load slave transducer 24. Transducer 24 may suitably be one such as the I/P Transducer and Valve Operator manufactured by the Minneapolis-Honeywell Regulating Company as disclosed in their specification FS 301–3A dated June 1959. This transducer is of the pneumatic type and in response to increasing current produces a correspondingly increasing output air pressure. The air to the transducer is provided from an air supply 26. The output of transducer 24 is utilized to actuate an air operated motor such as a force motor 27 which actuates the mechanical controls 28 of the inlet valves in slave turbine #1. With an increasing output from power amplifier 24 there is caused a correspondingly increasing opening of the inlet valves of the slave turbine #1, the opposite situation obtaining with a decreasing output from amplifier 24.

Thus, with the arrangement as described, the slave turbine is made to dynamically share in load changes of the multiple turbine unit arrangement in accordance with the position selected for incremental load potentiometer 22. It is, of course, appreciated that the load carried by the the slave turbine accordingly can increase or decrease from the load represented by the base control voltage, i.e., reference voltage 16.

To control the pressure in the high pressure process header, the output of high pressure extraction pressure translator 142 is applied to the sub-channels for controlling slave turbines 1 and 2 with regard to this variable. The output of translator 142 is applied as the incremental control voltage input to a high pressure slave summer 32 through an incremental control potentiometer 30 externally controllable by a knob 31. The other input to summer 32 is a reference voltage 34 externally controllable by a knob 35 which establishes the base flow share of the slave #1 turbine with respect to the high pressure process header. The base flow control voltage input to summer 32 is suitably chosen to be of a negative polarity with the sign conventions adopted in the systems of FIGS. 1 to 3, and the incremental control voltage input initially chosen establishes the high pressure process fluid share of slave turbine #1. Since with a decrease in the pressure in the high pressure process header, the output of extraction pressure translator 142 is a negatively increasing voltage, and of the same polarity as the base control voltage, the output of summer 32 is increased in the positive direction, the output of summer 32 decreasing with an increase in the pressure in the high pressure process header. The output of summer 32 is applied to a power amplifier 38 through an in-out potentiometer 36 externally controllable by a knob 37. The output of power amplifier 38 actuates a flow slave transducer 40 which is similar to flow slave transducers 24 and 24'. Slave transducer 40 actuates a force motor 42 which in turn actuates the mechanical controls 44 for the high pressure conduit interstage valves of slave turbine #1. If there is an increase in presure in the high pressure header, then the output of high pressure extraction pressure translator 142 is one which increases in the positive direction. Accordingly, the incremental control input to flow slave summer 32 bucks the base flow control voltage input thereto whereby the net output of summer 32 decreases with the consequently decreasing movement of the mechanical controls for the valves in the high pressure extraction pressure conduit of slave turbine #1 and vice versa. Thus it is seen that the changes in pressure of high pressure process header are dynamically shared by the mechanically controlled slave units.

For controlling the pressure in the low pressure process header, the same slave sub-channels arrangement is provided as that in the high pressure process header control sub-channels. Thus the output of low pressure extraction pressure translator 162 is also applied to two like sub-channels. The sub-channel which controls the mechanical controls for the low pressure extraction valves of slave turbine #1 accordingly includes a low pressure slave summer 46, whose inputs are the base flow control reference voltage 48 externally controllable by a knob 49 and the incremental control voltage 50 externally controllable by a knob 51, an in-out potentiometer 52, externally controllable by a knob 53, a power amplifier 54, a flow slave transducer 56 which is similar to the other flow slave transducers hereinabove described and controlling the mechanical controls 60 for the low pressure extraction valves of slave turbine #1.

It is to be noted from the foregoing that since the inputs to the high and low pressure extraction summers 32, etc. and 46, etc., are taken from translators 142 and 162, respectively, the latter translators providing outputs representative of pressures in the high and low pressure process headers respectively, stream flow sharing and pressure control in these headers may be maintained even if the "master" turbine is shut down. In the latter situation, the steam flow sharing would be maintained in a chosen ratio between the mechanically controlled turbines.

As has been stated above, the system of FIGS. 1 to 3 is one wherein the local multi-turbine unit arrangement may be tied into a utility network wherein there are included means for maintaining frequency control of the local arrangement and the steam control valves in the local arrangement are permitted the freedom to establish the exhaust process header pressure by changing the generated load as desired. In the event that the system of FIGS. 1 to 3 were to be utilized with a multi-turbine unit arrangement which is not tied into a utility network, then, of course, there would be no need for an exhaust process header regulating channel and consequently exhaust pressure transducer 66, exhaust pressure translator 132, exhaust pressure summer 10 and power limit summer 128 would not be required. In this situation, the dynamic sharing of load between the master and the slave turbines would be effected by applying the output of speed summer 110 to load slave summers 14 and 14' through incremental potentiometers 18 and 18' respectively.

*Speed translator*

In FIG. 5 there is shown a block diagram of a circuit suitable for use as the speed translator 104 of FIGS. 1–3 and in FIG. 6 there is shown a schematic diagram of a circuit represented by the block diagram of FIG. 5.

Referring now to FIG. 5, the output from speed transducer 60 (FIGS. 1 to 3) is applied as an input to a stage 200 legended as an A.C. to D.C. converter, a stage 202, legended as double resonant network, and a stage 204 also legended as an A.C. to D.C. converter.

Converter stages 200 and 204 may suitably be full-wave rectifiers at whose outputs there are provided unidirectional voltages whose magnitudes are directly proportional to the magnitude of the output of speed transducer 60. These unidirectional voltages accordingly exhibit a linear increase in magnitude with turbine speed. The unidirectional output of converter stage 200 is applied to a stage 206 legened as a 3600 r.p.m. bias network which may be an attenuating network whereby an attenuated portion of the output of converter 200 exists at the output of stage 206. The double resonant network of stage 202 is suitably an inductor-capacitor circuit which produces an alternating current voltage output which is a function of the frequency of the output of speed transducer 60. The amplitude of the voltage output of stage 202 at any given frequency is a linear function of the A.C. voltage applied thereto.

The output of double resonant network 202 is applied as an input to an A.C. to D.C. converter stage 208 which may also be a full wave rectifier, the output produced by stage 208 being a unidirectional voltage whose output is a function of the A.C. input frequency.

The circuit components of stages 200 and 206 are so arranged and their values so chosen whereby the voltage that is produced thereby increases in the negative direction with an increase in the magnitude of the A.C. input thereto. The circuit components are so arranged in double resonant network 202 and converter 208 such that the output of stage 208 is a positive voltage which exhibits a maximum at a predetermined input frequency.

The output of bias network 206 and converter 208 are added, such addition being shown conceptually at stage 207 whereby the unidirectional voltage resulting from this summation is a function of the input frequency and of the A.C. voltage. The output of 3600 r.p.m. bias network 206 is adjusted to cancel the output from the double resonant network branch of the circuit at a chosen input frequency such as 420 cycles per second (3600 r.p.m.). This adjustment for zero net output voltage at this chosen frequency is substantially independent of the magnitude of the output of speed transducer 60 since both bias network 206 and converter 208 have linear unidirectional voltage outputs with respect to the A.C. input voltage. The alternating current rectifier ripple components in the resultant from the summation at stage 207 are removed in a suitable low pass filter 210 and the output of filter 210 is attenuated by an adjustable amount in a speed regulation network stage 212 to obtain the desired speed sensing signal.

The speed-load set signal is obtained from a potentiometer 215. This is the potentiometer whose setting is externally controllable by the knob 107 associated with the speed load control mechanism stage 105 (FIGS. 1–3). The speed-load control mechanism also includes a high speed level network 214 connected to the positive D.C. supply and a low speed level network 216 connected to the negative D.C. supply, potentiometer 215 being connected between the outputs of stages 214 and 216. Potentiometer 215 is supplied with positive and negative voltages by networks 214 and 216 respectively, these networks providing an adjustment and regulation of the voltages appearing at each end of potentiometer 215.

In the arrangement of the control system of this invention, a positive output algebraic sum of the speed sensing and the speed-load set output signal voltages has been chosen to be required to start the master turbine. In order to insure that this is the case, regardless of the setting of the speed-load control potentiometer 215, a positive bias is added to the speed sensing signal during startup. It is, of course, realized that otherwise this speed sensing signal is zero volt at zero speed. Such positive bias addition is accomplished by energizing a transfer relay 218 whose drive may be supplied by a suitable actuator 219 (not shown). During startup conditions, normally closed relay contacts 218A associated with transfer relay 218 are transferred to the open state by the actuation of transfer relay 218 and a startup bias network 220 injects a positive D.C. voltage obtained from the positive voltage supply. As the turbine is started and speed increases, a D.C. voltage is developed at the output of a transfer bias network 224, by means of converter 204 and a filter 222 which are energized by the A.C. output of speed transducer 60. This transfer bias network output voltage is subtracted from the startup bias voltage produced from stage 220 to reduce the net bias voltage as the turbine speed is increased by changing the setting on the speed load control potentiometer 215. The attenuation of the transfer bias network is suitably adjusted for a net zero bias and a chosen A.C. input frequency, such as 385 cycles per second (3300 r.p.m. turbine speed). At this chosen frequency, the actuation is caused to be removed from transfer relay 218 and, thereafter, normally closed contacts 218 maintain the net injected bias voltage at zero volt.

The circuit of FIG. 6 which may be utilized as the speed translator as depicted in block form in FIG. 5 is described for convenience of explanation as comprising three sections, viz., those sections associated with secondary winding portions 234, 236 and 238 of transformer 230, the signal produced at the output of speed transducer 60 being applied to the primary winding 232 of transformer 230.

The section associated with secondary winding portion 234 produces a D.C. voltage having an amplitude directly proportional to the amplitude of a voltage produced from speed transducer 60. In this section, the voltage across secondary winding portion 234 is full wave rectified in a rectifier 237, rectifier 237 corresponding to A.C. to D.C. converter stage 200 in FIG. 5 and then is applied across the series arrangement of a variable resistor 235 and a resistor 240. The voltage which results across resistors 235 and 240 is a unidirectional voltage with terminal 239 negative with respect to terminal 241. Variable resistor 235 is the 3600 r.p.m. bias network 206 of FIG. 5 for providing zero voltage of the speed sensing signal output at an input frequency of 420 cycles per second.

The section associated with secondary winding portion 236 produces a voltage which is both proportional to the amplitude and the frequency of the voltage produced at the output of speed transducer 60. In this section, the frequency sensitive elements are series connected inductor 242, parallel connected series arrangement of inductor 244 and capacitor 246, these elements being the double resonant network 202 of FIG. 5. The values of these elements are so chosen whereby inductors 242 and 244 resonate with capacitor 246 at a frequency below the operating range of the turbine and inductor 244 resonates with capacitor 246 at a frequency above the operating range of the turbine. Consequently, the voltage developed across resistor 250 is at a maximum at the lower resonating frequency and at a minimum at the higher resonating frequency. The speed control operation is confined to the range of A.C. input frequency bounded by these two resonating frequencies. Such range possess a negative slope of voltage as a function of frequency. Resistor 250 and the net D.C. load determines the magnitude of the lower resonating frequency output voltage and hence the actual value of this slope.

The output of the double resonant network is converted to a D.C. voltage by the full wave bridge rectifier circuit 252 which corresponds to the A.C. to D.C. converter 208 of FIG. 5, the resultant unidirectional voltage output therefrom being attenuated in the resistor voltage divider comprising the series arrangement of resistors 254 and 256.

The output across series arrangement of resistors 235 and 240, i.e., the 3600 r.p.m. bias network, and the output of the double resonant network as determined by the voltage across resistor 256 are in series bucking circuit arrangement. Variable resistor 235 is adjusted to provide a net zero D.C. component with respect to common at the chosen frequency such as 420 cycles per second A.C. input frequency with transfer relay 218 deenergized. The A.C. components appearing in the output of this series bucking circuit are removed in the low pass filter circuit comprising a series connected inductor 258 and a parallel connected capacitor 260. The remaining D.C. component is coupled to the speed regulation network attenuator (stage 212 of FIG. 5), which comprises a resistor 262, a variable resistor 264 and a resistor 266. The point at which variable resistor 264 is adjusted is chosen so as to set the proportion of the developed D.C. voltage impressed on the speed sensing signal output terminals and, thus, it is utilized to select the desired incremental output voltage per cycle change of input frequency. This output voltage is at common potential at the chosen frequency of the system, i.e., 420 cycles per second, is positive with respect to common at input frequencies lower than the aforesaid chosen frequency and is negative for input frequencies higher than the chosen frequency.

The starting conditions for the turbine consist of transfer relay 218 being in the energized state and approximately zero frequency output from speed transducer 60. Under these conditions there is little or no output developed by the 3600 r.p.m. bias transfer network or the double-resonant network. A positive D.C. output exists at startup at the speed sensing signal terminal 300 as a consequence of normally closed contacts 218A being open and the connection of terminal 300 to the voltage divider comprising a resistor 280, a variable resistor 282 and a resistor 284. From variable resistor 282, there is taken a portion of the positive D.C. supply that is coupled to terminal 300.

The section associated with secondary winding portion 238 functions to provide startup bias. In this section, the A.C. input voltage is rectified in a full wave bridge rectifier 268, the latter rectifier corresponding to the A.C. to D.C. converter 204 of FIG. 5. The output of rectifier 268 is filtered in a series connected inductor 270 and a parallel connected capacitor 272, inductor 270 and capacitor 272 comprising filter stage 222 of FIG. 5. The voltage output from the filter is attenuated in the series arrangement of a resistor 274, a variable resistor 276 and a resistor 278, resistors 274, 276 and 278 corresponding to the transfer bias network 224 depicted in FIG. 5. The voltage taken from the tapped point on variable resistor 276, i.e., the transfer bias network, sets the level of a developed negative D.C. voltage that is connected in series with the startup bias voltage. Thus as the turbine speed is increased, the transfer bias voltage reduces the net effect of the amount of the startup bias appearing at the speed sensing signal terminal 300. Capacitor 281 provides filtering for this voltage. Variable resistor 276 may be suitably adjusted such that there is provided net zero voltage with respect to common at an input frequency of about 385 cycles per second (3300 r.p.m.) turbine speed. At this point, and, of course, at higher input frequencies, transfer relay 218 is caused to be deenergized. Thus, only the 3600 r.p.m. bias and double resonant networks remain in the circuit to produce a speed sensing signal output voltage.

Connected between the positive potential source and the negative potential source is the series arrangement of a resistor 286, variable resistor 288, a resistor 290, a resistor 292 and a variable resistor 294, a resistor 296 and a resistor 298, the junction 291 of resistors 290 and 292 being at common potential. A voltage regulating arrangement comprising series connected breakdown diodes 289 and 285 is connected between common and the junction 287 of resistors 286 and 288. Similarly, the series arrangement of breakdown diodes 293 and 295 is connected between common and the junction 297 of resistors 296 and 298. Connected between tapped points on variable resistors 288 and 294 is a potentiometer 299, this being the speed-load control potentiometer externally controllable by knob 107 (FIGS. 1 to 3). The high speed level set for the system is set when the slider is at a chosen upper position on variable resistor 288. This high speed adjustment is a setting for a no load turbine speed. The voltage provided at tapped point on variable resistor 294 provides the low speed level for a no load turbine speed. The setting on speed-load potentiometer 299 enables the variation of the speed-load set signal.

*Pressure transducer*

In FIG. 7 there is shown a schematic diagram of a pressure transducer arrangement suitable for use as the pressure transducers of the system of FIGS. 1 to 3. In this circuit, the output of a pressure transducer exciting oscillator (oscillator 122 of FIGS. 1–3) and having a frequency such as about 3 kc. is applied to the primary winding 304 of a transformer 302. The voltage appearing in secondary winding 306 of transformer 302 energizes the primary winding 312 of a differential transformer 310, which also comprises secondary windings 314 and 316, through a series connected resistor 308. A resistor 309 connected across secondary winding 306 serves to provide the required resistive load to maintain a low impedance of nearly zero phase angle on primary winding 304 of transformer 302 to minimize the influence of interconnecting cable capacitance on the voltage in secondary winding 306. Resistor 308 is chosen to have a large value compared to the resistance of primary winding 312 and consequently functions to provide a comparatively constant current source independent of ambient temperature.

The core 315 of variable differential transformer 310 is caused to move by the action of changes in applied pressure such as, for example, the response of a Bourdon tube (not shown) to pressure changes. The two secondary windings 314 and 316 are connected in a series bucking arrangement and a net difference voltage appears at the output of the circuit. A capacitor 318 is connected across this output, a net capacitance value being chosen for capacitor 318, such that the output voltage of the circuit is maximized by the forming of a series turned circuit by capacitor 318 and the inductance of secondary windings 314 and 316.

A voltage divider comprising resistors 320, 322 and 324 together with a variable resistor 326 connected across resistor 322 functions as a balancing network to compensate for the influences of various tolerances on the variable differential transformer's null output voltage. This balancing network provides an A.C. potential of adjustable amplitude and phase that is coupled from the output back to junction 313 of the secondary windings of transformer 310. Thus, the terminal voltage of one secondary winding may be slightly shifted relative to the other winding by means of potentiometer 326 in order to obtain a null output whose fundamental frequency component has substantially zero amplitude.

The pressure transducer of FIG. 7, functions to convert input pressure to an electrical circuit voltage. This is accomplished by translating pressure into a mechanical motion with a precision Bourdon tube assembly, which in turn positions core 315, core 315 being rigidly attached to the tip of the Bourdon tube.

The voltages induced in the secondary windings of transformer 310 are determined by the axial position of core 315. When core 315 is centrally located, an equal amount of magnetic flux links secondary windings 314 and 316 and equal voltages appear at their terminals. As the core is moved from the central position, more flux is caused to link one secondary than the other with a resultant larger induced voltage in the secondary winding toward which the core is moved. Since the two secondary windings are electrically connected in series opposition, the two voltages therein are opposite in phase. The resulting net voltage difference between the voltages in the secondary windings is the transformer output voltage. The net difference voltage when the core is moved from the centrally located position is a linearly increasing voltage and the position of core 315 determines the output voltage and its phase. A null output voltage for a given pressure, i.e., a calibration pressure may be chosen from the circuit of FIG. 7 for a specified pressure and should the input pressure change from this given value, the A.C. output voltage and its phase would indicate the amount and direction of such change.

*Pressure translator*

In FIG. 8, there is shown a block diagram of a pressure translator suitable for use as the pressure translators of the system of FIGS. 1 to 3.

The pressure translator is an electronic A.C. or D.C. converter circuit, the function of which is to provide a D.C. output voltage which is a chosen linear function of the deviation in the amplitude of an A.C. input thereto from an adjustable A.C. bias voltage.

Referring now to FIG. 8, the output of the pressure transducer which is a voltage having the frequency of oscillator 122, an amplitude proportional to the deviation in steam line pressure from the transducer null pressure and a phase indicative of the direction of the deviation, is applied to an amplifier stage 330. Amplifier 330 reproduces the output of the pressure transducer at a suitable power level for its summation with the A.C. voltage from a pressure level set adjustment circuit 334, such adjustment being controllable externally in all of the pressure translators of the system by a control knob such as designated by 335 and enabling the setting of a desired steam line pressure. Phase shift network 332 and pressure set adjustment 334 provide an adjustable A.C. bias voltage having the frequency of oscillator 122.

The output of amplifier 330 and pressure set adjustment stage 334 are algebraically summed as shown conceptually in stage 336 and this summed voltage is coupled to a second amplifier 338 which provides the signal voltage input to a demodulator 340. Demodulator 340 may suitably be a phase sensitive A.C. to D.C. converter whose D.C. output voltage is proportional to the amplitude of the A.C. signal voltage applied thereto and its electrical phase, relative to the A.C. reference voltage from oscillator 122. The reference voltage is produced by passing the output of oscillator 122 thorugh a phase shift network 342.

The output of demodulator 340 is suitably a unidirectional potential that is coupled to a low pass filter 344 which attenuates the components therein having the frequency of oscillator 122 and higher frequency components. The time constant network 346 is employed following filter stage 344 to provide the desired output voltage transient response.

In FIG. 8, oscillator 122 supplies the pressure transducer, pressure level set adjustment bias voltage and the demodulator reference voltage. Thus, if the electrical phase of the pressure transducer output for steam pressures below the transducer calibration (null) pressure is chosen to be a leading phase angle of a give amount of degrees relative to its input, and the two adjustable phase shift networks 332 and 342 in the pressure translator of FIG. 8 are arranged such that the electrical phase of their respective output voltages corresponds to the phase of the output voltage of the pressure transducer associated therewith, then such phase correspondence results in a maximum D.C. output voltage for a given demodulator signal voltage. In addition, it serves to maintain the linear incremental pressure translator gain independent of the bias voltage from the pressure level set adjustment.

The ouput voltage of the pressure translator is determined by both the A.C. signal applied thereto from the pressure transducer and the bias voltage supplied by the setting on the pressure level set potentiometer in the pressure set adjustment circuit 334. Thus, if it is first considered that the bias voltage is zero and the A.C. signal from the pressure transducer is zero when the steam pressure is at the calibration pressure of the transducer, then the A.C. input voltage to and the D.C. output voltage from demodulator 340 is zero. The output of demodulator 340 is proportional to deviations in pressure from the transducer calibration pressure, the circuit elements in the demodulator 340 being so chosen and arranged such that the polarity reverses as the pressure changes from above to below the calibration pressure value. To provide a chosen linear range of output voltage from demodulator 340, A.C. voltage limiters are suitably incorporated in amplifier circuits 330 and 338.

As the A.C. bias voltage is increased from the pressure set adjustment by externally controlling a potentiometer contained therein by knob 335, this bias voltage is in phase opposition to the amplified A.C. output voltage from amplifier 330 when the pressure applied to a pressure transducer is below its calibration pressure. Thus, the linear range of the voltage output of demodulator 340, as a function of steam pressure, is caused to take place about a mean pressure which is located below the transducer calibration pressure. Such depression of the operating range is proportional to the selected A.C. bias voltage. At a chosen maximum A.C. bias voltage zero output voltage is produced from the demodulator 340, such pressure being a minimum calibration pressure.

Referring now to FIGS. 9 to 11, wherein there is shown a schematic representation of the pressure translator of FIG. 8, the output from the pressure transducer is applied to amplifier 330 which consists of transistor 350 and its associated circuit components. Resistor 352 and the breakdown diodes 354, 356 and 358 provide a voltage regulator circuit. The input from the pressure transducer is coupled to transistor 350. Resistor 360 and the shunt connected diodes 362 and 364 form an A.C. voltage limiter circuit which prevents excessive voltages from being applied to the base of transistor 350 when the pressure control system is not operating or the turbine is shut down. For the normal operating input voltages to a translator which may be about 0.10 volt peak to peak or less, reverse connected diodes 362 and 364 exhibit high forward and inverse resistances relative to resistor 360. With these conditions, the input signal is applied to the base of transistor 350 with substantially no attenuation. When the instantaneous input voltage exceeds a chosen value such as about + or −0.45 volt, diodes 362 and 364 exhibit a low forward resistance relative to resistor 360. Consequently, the input voltage to the base of transistor 350 is limited to a voltage of a chosen value such as about 0.9 volt, peak to peak.

The input A.C. signal is coupled to the base of transistor 360 through a capacitor 366. Transistor 350 is connected as an emitter follower stage to raise the power level of the input signal. A D.C. bias voltage for the base of transistor 350 is supplied from the resistor voltage divider comprising resistors 368 and 370. This divider is connected from the collector of transistor 350 to common and provides, in conjunction with the collector resistor 372, a degenerative feedback D.C. voltage to stabilize the transistor operating characteristics. A capacitor 374 bypasses the A.C. voltage appearing at the collector to common. The output voltage of the amplifier appears across the emitter resistor 376.

A passive adder circuit comprising resistors 378 and 380 and the input impedance to transistor 384 performs the summing operation of the amplifier input signal and the adjustable bias voltages. The amplified input signal from transistor 350 is A.C. coupled through a capacitor 382. A capacitor 386 A.C. couples the bias voltage from the slider of the pressure level set adjustment potentiometer 400 (this is the potentiometer externally controllable in the pressure translators of the system of FIGS. 2 to 4), to junction point 381. The input impedance to the transistor 384 stage is chosen to be small compared to resistors 378 and 380. Thus, the current supplied to the base of transistor 384 from each source is substantially independent of the other source, i.e., the total current through the A.C. input impedance is the sum of the currents from each signal source. In the normal pressure control operating range with steam line pressure below transducer calibration pressure, the amplified input signal and the adjustable bias voltage are opposite in electrical phase. Consequently, the two currents to the input impedance of transistor 384 subtract to produce a net difference A.C. input current to the base thereof.

The second amplifier 338 is a three-stage, capacitance coupled A.C. amplifier comprising transistors 384, 390, 410, 420, 430 and 440 and their associated circuit components. The input signal to this amplifier is the net difference current output of the passive summing network comprising resistors 378 and 380. The output voltage of the amplifier appears at the emitter of transistor 440. This output is A.C. coupled to the demodulator circuit through a capacitor 450 and an isolating resistor 448, the potentiometer 392 enabling gain adjustment. Signal voltage limiters are incorporated in the input circuitry of the stages comprising transistors 410 and 420 and transistors 430 and 440 respectively.

Each of the three stages of amplifier 338, i.e., those comprising transistors 384 and 390, transistors 410 and 420 and transistors 430 and 440 substantially comprise the same basic circuitry. Thus, in considering the first stage which comprises transistors 384 and 390 and their associated circuit components, the input transistor 384 is connected as a common emitter amplifier. Its collector biasing voltage is supplied through a resistor 388. The voltage drop across its emitter resistor 389 produces a negative feedback signal to stabilize the gain and reduce the phase shift in the first stage. In addition to the input signal which is A.C. coupled to the base of transistor 384 through capacitors 382 and 386 in the passive summing network, a degenerative feedback current from transistor 390 is also fed to the base of transistor 384 through a filter and voltage divider network comprising resistors 383 and 385 and a capacitor 387. This feedback signal establishes the D.C. operating characteristics and the A.C. gain as well as providing a low A.C. input impedance.

The output voltage, taken from the collector of transistor 384 is coupled directly to the base of transistor 390 which is connected as an emitter follower amplifier and raises the power level of the signal applied thereto. The emitter resistors 391 and 393 comprise a voltage divider network to supply the degenerative feedback network. The output voltage from transistor 390 is taken from its emitter.

The second or third stages of amplifier 338 are similar in structure and operation to the first stage as described, they differing only in the type of input and output coupling networks used for each stage.

Thus, the output of the first amplifier stage is applied to an adjustable attenuator network comprising a potentiometer 392 and a resistor 394. The slider of potentiometer 392 is positioned to select the proper pressure control sub-system gain, the range of gain adjustment being suitably about five to one. Capacitor 396 A.C. couples the voltage tapped on potentiometer 392 to a voltage limiter comprising a resistor 398, a diode 401 and a diode 402. A capacitor 408 A.C. couples the output of the limiter network to the base of transistor 410 and resistors 398 and 406 determine the input signal current at this point. The output taken from the emitter of transistor 420 is A.C. coupled to a voltage limiter network 424 by a capacitor 422. A capacitor 428 A.C. couples the output of the latter limiter network to the stage comprising transistors 430 and 440. The output signal from amplifier 338 is coupled to the demodulator 340 by capacitor 450 and isolating resistor 448.

Demodulator 340 comprises diodes 452 and 456 together with a transformer 446 and associated circuitry. The A.C. input signal to the demodulator is applied between the slider of potentiometer 454 and common through an isolating series resistor 448. A unidirectional D.C. output voltage exists at the slider of the potentiometer 454 which is coupled to the output through a resistor 458. The reference A.C. voltage of the chosen frequency is coupled to the primary winding 445 of transformer 446 from a phase shift network as will be further described hereinbelow.

Functionally, demodulator 340 is a phase sensitive half wave A.C. to D.C. converter and its basic operation may be considered analogous to that of a synchronous switch connected from point 455 on potentiometer 454 to common with the slider open circuited. Such hypothetical switch would be caused to open or close by alternate half cycles of the demodulator reference voltage from oscillator 122. The input signal voltage to the demodulator is either in phase or 180° out of phase with this reference voltage, the phase reversal being dependent upon the phase of the net input signal to amplifier 338. When such hypothetical switch is closed, the output voltage is zero and a half cycle of signal voltage appears across resistor 448. When it is opened, the alternate half cycle of the signal voltage is coupled to the output. Thus, the output signal is a half wave rectified voltage whose average value and polarity is proportional to the amplitude and phase of the demodulator A.C. signal voltage.

In the circuit of FIGS. 9–11, the demodulator reference voltage is coupled to the primary winding 445 of transformer 446. Terminal 449 of the center-tapped secondary winding 447 is connected to common. The balance potentiometer 454, resistors 451 and 459 and diodes 452 and 454 are connected in series across the full transformer secondary winding 447. The values of the components are so chosen that each voltage in the secondary winding has a value peak to peak which is greater than the maximum limited signal voltage peak to peak. During the half cycle of the reference voltage when terminal 443 of secondary winding 447 is positive with respect to terminal 453, the comparatively high amplitude of the transformer voltage relative to the signal voltage prevents diodes 452 and 456 from conducting. Thus, the only path for demodulator input signal current is to the output terminal 460. During the next half cycle of the reference voltage, diodes 452 and 456 conduct and the parallel impedance of the two halves of the series demodulator circuit shunts the output signal. Such switching operation substantially reduces the amount of the signal voltage appearing at the output terminals but does not result in the output voltage being exactly zero during this half cycle of reference voltage.

Potentiometer 454 is utilized to compensate for transformer and other components tolerances. The slider of potentiometer 454 is adjusted such that there is provided a zero D.C. output voltage when the A.C. input to the demodulator is zero volt.

The half-wave recified demodulator output voltage is coupled to output 460 of the translator through resistor 458. Capacitors 466, 468 and 470 are connected in series with a potentiometer 472 and capacitors 462 and 464 are connected in parallel with the output of the translator. Resistor 458 increases the output impedance of the translator and together with capacitors 462 and 464 forms a low pass filter. Such filter provides a D.C. output voltage substantially free of the reference A.C. voltage and higher frequency ripple voltage components.

Capacitors 466, 468 and 470 and potentiometer 472 operating in conjunction with the output impedance of the translator and the external impedance connected to such output comprise a lag-lead time constant network. With potentiometer adjusted for zero effective resistance, the aforesaid network operates as a low pass filter and has a time constant of a chosen value such as 30 seconds depending upon the circuit component values. As the resistance of potentiometer 472 is increased, the attenuation at high frequencies is caused to remain at a fixed attenuation level in contrast to the increasing attenuation with frequency exhibited by a low pass filter. Furthermore, the time constant increases and the constant level of attenuation decreases. Such time constant network is suitably adjusted to provide transient response characteristics of the pressure control for optimum system performance.

A transformer 412 supplies two phase shift networks which adjust the phase of the pressure set bias voltage and the demodulator reference voltage. For the desired operation of pressure translator, the electrical phase of the latter voltages have to correspond to the phase of the input signal supplied from the pressure transducer.

Primary winding 411 of transformer 412 is supplied from oscillator 122. Secondary winding 413 is center-tapped to common. The reference voltage for the demodulator 340 is obtained from the potential drop appearing at the junction 416 of capacitors 415 and 417 and the resistor 418. This RC series circuit is supplied from the full secondary voltage from winding 413 and the current through the RC circuit has a leading electrical phase angle with respect to the voltage in transformer 412. For example, if the condition is considered where the series resistance in resistors 418 and 419 is adjusted to equal the value of the parallel impedance of capacitors 415 and 417 and where the circuit is only lightly loaded, with proper selection of component values, the current will have a phase shift of 45° leading with respect to the total voltage. Consequently, the demodulator reference voltage supplying transformer 446 is the vector sum of one half of the voltage in secondary winding 413 of transformer 412 and the voltage drop across resistors 418 and 419. This vector sum is a voltage which leads the voltage in secondary winding 413 by 90° and has the same magnitude as the voltage in this half of secondary winding 413. A phase shift generator than, or less than, such value may be obtained by adjusting a variable resistor 419, the magnitude of the voltage being substantially independent of the adjustment.

Similar operation occurs in the series circuit of a capacitor 425, a resistor 426 and a potentiometer 427 which supplies a pressure level set adjustment voltage. A resistor 432 and a potentiometer 434 are in series arrangement with the pressure level set adjustment and provide a means of adjusting the maximum bias voltage available from the pressure level set adjusting potentiometer.

The polarity of the output of a pressure translator depends upon the polarity of diodes 452 and 456. Where a tranlator produces a positive increment of voltage with an increase in pressure, the diodes are poled as shown in FIGS. 9 to 11. Where a translator produces a negative increment, the polarity of diodes 452 and 456 is reversed.

Summers

The summers of the system of this invention depicted in FIGS. 1 to 3 may be of several types. Their function is to provide an output voltage which is a specified linear function of their input voltage or voltages within a suitably limited range.

The summers which may be effectively utilized for the above-stated purpose all comprise, as a basic element, a high gain, wide-band, D.C. inverting amplifier and a summing network with one or more input impedances and one or more feedback impedances.

In FIG. 12 there is shown a simple circuit configuration of such amplier. The open-loop voltage gain of the D.C. amplifier therein may be, for practical purposes, considered infinite. The expression $e_{out}$, the output voltage in terms of the input voltage for infinite open loop gain is:

$$e_{out} = -\frac{R_F e_{in}}{R_I} \quad (1)$$

The closed loop gain is then $$\frac{R_F}{R_I}$$

To differentiate the input voltage $[e_{in}(t)]$, an input capacitor $C_1$ has to be used in place of resistor $R_I$ in the circuit of FIG. 12. For infinite open loop amplifier voltage gain, the output voltage $[e_{out}(t)]$ is then proportional to the time derivative of the input voltage $[e_{in}(t)]$; and $$e_{out}(t) = -R_F C_I \frac{de_{in}(t)}{dt} \quad (2)$$

To integrate the input voltage $[e_{in}(t)]$, a feedback capacitor $C_F$ has to be used in place of the feedback resistor $R_F$ in the circuit of FIG. 12. For infinite open-loop amplifier voltage gain, the output voltage $[e_{out}(t)]$ is then proportional to the time integral of the input voltage $[e_i(t)]$ and $$e_{out}(t) = -\frac{1}{R_I C_F} \int_0^t e_{in}(t)\, dt \quad (3)$$

If a step input voltage $(\Delta e_{in})$ is applied to such an integrating circuit, the resultant output voltage change $(\Delta e_{out})$ is a function of time and is computed by the equation:

$$\Delta e_{out} = -\frac{t}{R_I C_F} \Delta e_{in} \quad (4)$$

If the output voltage and the input voltage are both zero when the input step voltage is applied, Equation 4 simplifies to:

$$e_{out} = -\frac{t}{R_I C_F} e_{in} \quad (5)$$

The product $R_I C_F$ in Equations 3, 4 and 5 is the time constant and if $R_I$ is in megohms and $C_F$ is in microfarads, the time constant is in seconds. The time $(t)$ is also in seconds.

Suitably, the values of the components of summers are chosen such that their output voltages are limited to a maximum positive value such as between $+6$ and $+8$ volts and a maximum negative value such as between $-6$ and $-8$ volts.

In FIG. 13, there is shown a three input type summer. The output voltage therefrom may be expressed as $$e_0 = -R_F \left( \frac{e_{i1}}{R_{i1}} + \frac{e_{i2}}{R_{i2}} + \frac{e_{i3}}{R_{i3}} \right) \quad (6)$$

The potentiometer included in resistance $R_{i1}$ and $R_{i2}$ enable independent gain adjustments for the input No. 1 and input No. 2 channels respectively. The feedback capacitor is utilized to limit the frequency responsive of the D.C. amplifier. The feedback impedance comprises the parallel combination of resistance $R_F$ and the reactance of capacitor $C_F$. For steady D.C. voltages, the reactance of capacitor $C_F$ is infinite and the feedback impedance is essentially the resistance of $R_F$. As the frequency increases from 0 c.p.s., the reactance of capacitance $C_F$ and, consequently, the feedback impedance decreases. Accordingly, the gain decreases with frequency. The value of capacitance $C_F$ is suitably chosen such that the frequency response characteristic of the summer is down 3 db at a chosen frequency such as about 150 c.p.s.

The summer of FIG. 13 is suitably utilized as the slave summers of FIGS. 1 to 3. In operation, the inputs thereto would be the incremental control voltage and the base control voltage. As a one input summer, it could be used as an inverting summer of the system of FIGS. 1 to 3.

In FIG. 4, there is shown a three input summer with an internal bias injector. For steady D.C. input voltages, the output voltage $e_0$ is computed by the equation $$e_0 = -R_F \left( \frac{e_{i1}}{R_{i1}} + \frac{e_{i2}}{R_{i2}} + \frac{e_{i3}}{R_{i3}} + \frac{e_b}{R_b} \right) \quad (7)$$

With no internal bias voltage applied ($e_b = 0$) this summer functions the same as the summer of FIG. 13. The potentiometer in the three input channels enable independent gain adjustments in each channel respectively.

The internal bias injector provides a fourth input voltage which is utilized to bias the output voltage. The input bias voltage $e_b$ is applied to a fourth separate input resistance. The range of the input bias voltage may be chosen to be about $-1$ to $+1$ volt D.C. and its range of effect on the output voltage of the circuit may be about this same amount.

The internal bias injector is a voltage divider and bridge network comprising a potentiometer $R_4$ and resistors $R_5$, $R_6$, $R_7$ and $R_8$. The internal bias voltage $e_b$ taken from the slider of potentiometer $R_4$, is applied to input bias resistor $R_b$. The feedback capacitor $C_F$ functions to limit the frequency response of the D.C. amplifier.

The summer of FIG. 4 is suitably utilized as the valves' position command summers of FIGS. 1 to 3. The three inputs $e_1$, $e_2$ and $e_3$ are the speed channel, and high and low pressure conduit channel control signals. The fourth input voltage is utilized to bias the output voltage to provide for valves indexing and mechanical overtravel.

In FIG. 15 there is shown a one input type summer with a variable positive series voltage limiter and a variable negative voltage limiter. The input voltage $e_1$ is applied to the input resistor $R_I$. The feedback capacitor $C_F$ operates to limit the frequency response of the D.C. amplifier.

The output No. 1 voltage is variably negatively limited by a negative feedback voltage limiter $CR_1$.

The output No. 1 voltage is also limited by variable positive series voltage limiter $CR_2$.

The circuit of FIG. 15 is suitably utilized as the high pressure conduit extraction pressure summer of FIGS. 1 to 3. Variable resistors $R_A$ and $R_E$ are the externally controllable admission and extraction pressure potentiometers. Variable resistors $R_{A1}$ and $R_{E1}$ enable an admission range and an extraction range limit adjustment. Since the circuit of FIG. 15 is quite similar to that of FIG. 16, a more detailed explanation is given of the structure and operation of the circuit of FIG. 16.

In FIG. 16, there is shown a one-input type summer having two outputs with a variable positive series voltage limiter and a fixed negative feedback voltage limiter. For steady D.C. input voltages, the output No. 1 voltage when not limited by either voltage limiter is in accordance with the equation $$e_{o1} = -\frac{R_F}{R_I} e_i \qquad (8)$$

The input voltage $e_i$ is applied to the input resistor $R_I$. The feedback capacitor $C_F$ operates to limit the frequency response of the D.C. amplifier.

The output No. 1 voltage is limited to a maximum negative value, suitably about $-0.5$ by a fixed negative feedback voltage limiter comprising diode $CR_1$. The voltage across diode $CR_1$, is virtually equal to the output No. 1 voltage with respect to common since the input to the D.C. amplifier is virtually at common potential because for substantially all practical purposes, there is provided infinite gain. When the output No. 1 voltage is more positive than about $-0.5$ volt, diode $CR_1$ is nonconductive, its resistance is very high and its effect on the net feedback impedance is negligible. When the output No. 1 voltage falls to the negative limit value such as the aforestated $-0.5$ volt, diode $CR_1$ conducts and its resistance falls to a comparatively low value. Such low resistance shunts the feedback resistor $R_F$ and thereby causes a considerable reduction of the net feedback impedance. Since the closed-loop gain of the summer is equal in magnitude to the ratio of the net feedback impedance to the input impedance, this gain falls to a small value (suitably less than 0.1 with proper choice of component values). The output No. 1 voltage accordingly is limited to the chosen maximum negative value.

The output No. 1 voltage is also limited by a variable positive series voltage limiter so that this voltage cannot become more positive than the chosen value. With a variable resistor $R_1$ in a full upper position and with chosen circuit component values, such positive limit may be externally adjustable with a potentiometer $R_2$ to a value, for example between $-0.3$ and $+5.0$ volts. With potentiometer $R_1$ in a full lower position, $R_2$ can be utilized to adjust the positive limit to a value such as between $-0.3$ volt and $+1.5$ volts.

The variable positive series voltage limiter comprises diode $CR_2$, resistors $R_3$, $R_4$, variable resistor $R_1$, resistors $R_5$ and $R_6$, externally controllable potentiometer $R_2$ and a resistive load of a chosen value. When the output No. 1 voltage is less positive than the preset positive limit, diode $CR_2$ conducts and its resistance is relatively low. In this situation, the output No. 1 voltage is more positive than the output voltage from the amplifier, suitably about 0.6 volt more positive. When the output No. 1 voltage rises to the preset positive limit, diode $CR_2$ is rendered nonconductive and its resistance becomes very high. Consequently, the output No. 1 voltage is effectively disconnected from the D.C. amplifier output voltage and the bias voltage network for the limiter now determines the output No. 1 voltage.

The bias voltage network for the limiter comprises three voltage dividers. A first voltage divider comprises resistors $R_6$ and $R_5$ connected between common and the negative potential source. This first divider provides a negative voltage for the second voltage divider which consists of resistors $R_4$, $R_1$ and $R_2$ connected between the positive voltage source and the negative voltage from the first voltage divider. The second voltage divider provides a voltage for the third voltage divider, such voltage being taken from potentiometer $R_2$. The third voltage divider consists of resistor $R_3$ and the external resistive load and is connected between the slider on potentiometer $R_2$ and power common. The output No. 1 voltage is connected to the third voltage divider.

When the output No. 1 voltage is less positive than the voltage which it would assume if the D.C. amplifier output voltage were disconnected, i.e., the preset positive limit voltage which the third voltage divider comprising resistor $R_3$ and the resistive load would force it to assume, diode $CR_2$ conducts and its resistance is low. If this output No. 1 voltage is considerably less positive than the preset positive limit voltage, almost all of the current from the bias voltage network flows through the diode $CR_2$ and the low output impedance of the D.C. amplifier thereby bypassing the external resistive load. Consequently, almost all of the bias voltage appears across resistor $R_3$. In this condition the output No. 1 voltage is more positive than the D.C. amplifier output voltage.

As the output No. 1 voltage approaches the preset positive limit voltage, the resistance of diode $CR_2$ increases and some of the current from the bias voltage network flows through the external resistive load. At the same time, the current flow through this load from the D.C. amplifier is correspondingly reduced and the output No. 1 voltage continues to be the same amount more positive than the output voltage from the D.C. amplifier.

When the output No. 1 voltage rises to the voltage which it would assume if the D.C. amplifier output voltage were disconnected, i.e., the preset positive limit voltage which resistor $R_3$ and the resistive load would force it to assume, diode $CR_2$ is cut off and the output No. 1 voltage is effectively disconnected from the D.C. amplifier output voltage. The current from the bias voltage network now flows through the external resistive load bypassing diode $CR_2$ and the D.C. amplifier output impedance. Therefore, the bias voltage appears across the voltage divider of resistor $R_3$ and the load and the output No. 1 voltage is now determined by the bias voltage network. The output No. 1 voltage is then limited to the preset positive limit as determined by resistor $R_3$ and the load regardless of any further positive increase in the D.C. amplifier output voltage. As has been stated hereinabove, internal potentiometer $R_1$ and externally controllable potentiometer $R_2$ are utilized to adjust the limit voltage.

The D.C. amplifier output voltage rises to an upper positive value when positive limiting action occurs. This is understood when it is realized that in this situation, diode $CR_2$ disconnects all feedback circuitry except capacitor $C_1$ from the D.C. amplifier output so that the amplifier output voltage is limited only by the positive voltage limiter. Feedback capacitor $C_1$ minimizes high frequency noise after positive limiting has occurred and other feedback circuitry is consequently, disconnected thereby.

The D.C. amplifier output voltage, viz., the output No. 2 voltage may suitably be utilized to actuate an external trip circuit to energize a warning inductor, for example, when the output of No. 1 voltage becomes positively limited.

The circuit of FIG. 16 is suitably utilized as the low pressure conduit extraction pressure summer of the system of FIGS. 1 to 3. Its input voltage $e_i$ is the output of the low pressure conduit translator. Variably resistor $R_2$ is the externally controllable flow limit control potentiometer contained therein.

In FIG. 17 there is shown a circuit wherein a diode $CR_N$ provides a fixed negative limit. The voltage divider comprising resistors $R_{20}$, $R_{21}$ and $R_{22}$ connected between common and the negative voltage source injects a negative bias voltage into the input of the amplifier.

The circuit of FIG. 17 is suitably utilized as power limit summer 128 of the system of FIGS. 1 to 3 with only one input thereto. One of these inputs, viz., either $e_{i1}$ and $e_{i2}$ would be the output of the exhaust pressure summer 10. The negative bias voltage injected into the input of the summer insures that there is no limit imposed on the output of speed summer 110 when there is no input to power limit summer 128 from exhaust pressure translator 132. A variable resistor, $R_I$, is included in the circuit of FIG. 17 and adjusted to insure that the output of the power limit summer is always a little less negative than a chosen fixed negative limit to make certain that there is always a slight negative output from speed summer at the no load value to permit a minimum flow of steam into the turbine and thereby prevent motoring of the turbine generator set.

In FIG. 18, there is shown a three input, two output summer with a variable negative series voltage limiter externally controllable by a potentiometer and a variable negative feedback voltage limit controlled by an external voltage source. The circuit of FIG. 18 being suitably for use as speed summer 160 of the system of FIGS. 1 to 3. For steady D.C. input voltages, the output No. 1 voltage ($e_{o1}$) when not limited by either voltage limiter is in accordance with the equation:

$$e_{o1} = -R_F\left(\frac{e_{i1}}{R_{i1}} + \frac{e_{i2}}{R_{i2}} + \frac{e_{i3}}{R_{i3}}\right) \quad (10)$$

The feedback capacitor $C_F$ is utilized to limit the frequency response of the D.C. amplifier. Potentiometer $R_{Lim}$ is the externally controllable load limit potentiometer.

The output No. 1 voltage is limited by a variable negative series voltage limiter controlled by an external potentiometer so that this voltage cannot become more negative than an adjustable, preset value, such value suitably being between $+0.5$ volt and $-5$ volts which may be determined by an externally controllable load limit potentiometer $R_{Lim}$, the varying of the position of the slider on this potentiometer providing a correspondingly variably voltage substantially between these limits. The variable negative series voltage limiter comprises diode $CR_5$, resistors $R_A$, $R_E$ and $R_C$, potentiometer $R_{Lim}$ and a resistive load $R_L$. This negative voltage limiter functions in a manner similar to that described for the variable positive series voltage limiter in the circuit of FIG. 15. The feedback capacitor $C_F$ minimizes high frequency noise after limiting by the series limiter has occurred whereby the other feedback circuitry has been disconnected.

The output No. 1 voltage is also limited by a variable negative feedback voltage limiter controlled by an external voltage source so that the output No. 1 voltage cannot become more negative than a value determined by this external voltage source. Thus, as the external voltage source is varied from a negative value to a positive value, suitably from about $-1.5$ volts to $+4.5$ volts, the negative limit valve varies, suitably from about $-0.3$ to about $-6.3$ volts. The negative limit becomes more negative when the external voltage source becomes less negative or more positive.

The variable negative feedback voltage limiter comprises diode $CR_6$ and resistors $R_D$ and $R_E$. The voltage across diode $CR_6$ is virtually equal to its cathode voltage with respect to common because the input to the D.C. amplifier is virtually at common potential because of the feedback circuitry. When the output No. 1 voltage is less negative than the negative limit determined by the external voltage source, diode $CR_6$ is reversed biased, its resistance is very high and there is substantially no feedback current therethrough. When the output No. 1 voltage becomes as negative as the negative limit determined by the external voltage source, diode $CR_6$ conducts, its resistance becomes low and there is a large feedback current therethrough. This prevents the output No. 1 voltage from becoming any more negative than the negative limit determined by the external voltage source regardless of any further positive increases in the input voltage to the summer.

The cathode voltage of diode CR is determined by the external voltage source and by the D.C. amplifier output voltage. For a given external voltage, the cathode voltage of diode $CR_6$ rises and falls with the D.C. amplifier output voltage. When the cathode voltage of diode $CR_6$ becomes sufficiently negatively, suitably about $-0.6$ volt, diode $CR_6$ conducts.

In FIG. 19 there is shown a two input summer circuit for independently summing and then integrating, such circuit being suitable for use as the speed corrector stage 112 of FIGS. 1 to 3. This circuit suitably has two inputs, viz., the speed sensing signal and the speed-load set signal. The circuit provides one output voltage, includes a fixed negative voltage limiter and a variable positive series voltage limiter. For steady D.C. input voltages, the output voltage $[e_0(t)]$ when not limited by the negative or positive voltage limiter is in accordance with the equation:

$$e_o(t) = \frac{R_{FA}}{R_{iB}C_{FB}}\int_0^t \left(\frac{e_{i1}(t)}{R_{i1A}} + \frac{e_{i2}(t)}{R_{i2A}}\right)dt \quad (11)$$

When a step voltage having a value of $e_{i1}$ is applied to the input No. 1 at a time when both of the input voltages and the output voltage are zero, the resultant output voltage $e_0(t)$ is a function of time $(t)$, and is in accordance with the equation:

$$e_o(t) = \left(\frac{R_{FA}}{R_{iB}}\right)\left(\frac{t}{R_{i1A}C_{FB}}\right)e_{i1} \quad (12)$$

The components of the circuit may be suitably chosen such that with the value of resistor $R_{iB}$ in megohms and the value of capacitor $C_{FB}$ in microfarads, the time constant of the circuit product, $R_{iB} C_{FB}$ is in seconds.

The input voltage No. 1 voltage ($e_{i1}(t)$ is applied to a resistor $R_{i1A}$. The input No. 2 voltage $e_{i2}(t)$ is applied to a resistor $R_{i2A}$. The feedback capacitor $C_{FA}$ is utilized to limit the frequency response of D.C. amplifier A. The output voltage $e_{oA}(t)$ from D.C. amplifier A is applied to the input resistance $R_{iB}$ for D.C. amplifier B. The output voltage of the circuit of amplifier A is in accordance with the equation:

$$e_{oA}(t) = -R_{FA}\left(\frac{e_{i1}(t)}{R_{i1A}} + \frac{e_{i2}(t)}{R_{i2A}}\right) \quad (13)$$

The input resistance for D.C. amplifier B may be provided by either one of two circuit configurations. With a jumper J connected in the position legended "slow," the input resistance consists of resistor $R_S$ in series with the parallel combination of a potentiometer $R_V$ and resistor $R_X$. With jumper J connected in the position legended "fast," the input for amplifier B consists of resistor $R_T$ in series arrangement with parallel combination of the potentiometer $R_V$ and resistor $R_X$. When not limited by the positive or negative voltage limiter, the output voltages of amplifier B is expressed by the equation:

$$e_o(t) = -\frac{1}{R_{iB}C_{FB}}\int_0^t e_{oA}(t)\,dt \tag{14}$$

Equation 11 which specifies the output voltage of the circuit of FIG. 19 as a function of the input No. 1 voltage and the input No. 2 voltage is obtained by combining Equations 13 and 14.

The product $R_{iB}C_{FB}$ is the time constant for the integrating amplifier A. Potentiometer $R_V$ is utilized to adjust the time constant within the limits permitted by the connection of jumper J. However, regardless of this connection, the time constant may be increased by increasing the resistance of potentiometer $R_V$. With jumper J connected in the "fast" position, the time constant may be a chosen value such as about 0.9 to slightly less than 3.3 seconds. With jumper J connected in the "slow" position, the time constant may suitably be adjustable from about 3.5 seconds or less to about 5.9 seconds or more.

To enable negative voltage limiting in the circuit of FIG. 19, for example, at about −0.5 volt, the fixed negative feedback voltage limiter which comprises a diode $CR_7$ is included.

The functioning of this negative limiter is similar to that described for the fixed negative feedback voltage limiter of the circuit of FIG. 16.

The output voltage of the circuit of FIG. 19 may also be limited by a variable positive series voltage limiter so that this voltage cannot be more positive than an adjustable preset value, a suitable preset value being between about +2.0 and +4.5 volts. The variation of the resistance of potentiometer $R_Y$ enables the adjusting of the limited positive value. The variable positive voltage limiter comprises a diode $CR_8$, a resistor $R_K$, potentiometer $R_Y$, resistors $R_M$ and $R_N$, and the external resistive load, $R_L$. The operation of this positive voltage limiter is similar to that described for the variable positive series voltage limiter in the circuit of FIG. 16.

D.C. Amplifier

In FIG. 14, there is shown a block diagram of a D.C. amplifier suitable for use in the summer stages of the system of this invention. This amplifier receives its input voltage from the summing junction, i.e., the input resistance junction and normally operates in the system from a very small input error voltage at this junction.

The functional sections which comprise the amplifier are an electronic chopper 480, a carrier amplifier 482, a demodulator 484, a filter 486, an A.C. bypass network 488, a differential amplifier 490, a direct coupled amplifier 492, a positive limiter 494 and a negative limiter 496. The input voltage to the D.C. amplifier is applied to electronic chopper 480 which chops D.C. and low freqency A.C. components into a square wave carrier voltage. This square wave has a phase corresponding to the instantaneous polarity of the D.C. and low frequency A.C. input voltages, and also the amplitude of the square wave is proportional to them in magnitude.

The output of chopper 480 is amplified by carrier amplifier 482 and demodulated by demodulator 484 which is suitably of the phase-sensitive type. The demodulator output voltage is filtered in filter 486 and the output of filter 486 is applied as one input to differential amplifier 490. The input voltage to the D.C. amplifier is also applied to A.C. bypass network 488 which bypasses high frequency components from the summing junction, the output of network 488 being applied as the other input to differential amplifier 490.

The output voltage of carrier amplifier 482 is 180° out of phase with its input voltage. The phase sensitive demodulator 484 is connected such that the output of filter 486 is an amplified voltage opposite in polarity and phase respectively, to the D.C. and low frequency A.C. components of the input voltage to the D.C. amplifier. It is this amplified and inverted voltage which is applied to one input of differential amplifier 490.

The output voltage from A.C. bypass network 488 is chosen to be in phase with its input for a chosen range of frequencies. It is this non-inverted voltage which is applied to the other input of differential amplifier 490. The D.C. and low frequency A.C. input voltages are inverted whereas the high frequency A.C. input voltages are not. Consequently, in differential amplifier 490, there are summed two voltages which, together, represent all the desired components of input voltage to the D.C. amplifier and this sum is amplified. The combination in the circuit of FIG. 14 of an electronic chopper, a carrier amplifier, a demodulator, a filter, an A.C. bypass network and direct-coupled amplifier presents the advantages of a low D.C. zero drift characteristic and a wide-band frequency response.

The output voltage from differential amplifier 490 is applied to direct coupled amplifier 492 from which the amplifier output voltage is obtained. This output voltage is limited to a maximum positive value, suitably between +6.0 to +8.0 volts and to a maximum negative value, suitably between −6.0 to −8.0 volts. Voltage limitation is accomplished by applying the output voltage to positive limiter 494 and negative limiter 496, these limiters suitably being of the fixed feedback type.

Servo amplifier

In FIG. 20 there is shown an arrangement suitable for use as the servo amplifiers of the system of this invention. In this arrangement the valve position command voltage produced at the output of the pertinent summer is applied to an input T network comprising resistors 500 and 502 and a capacitor 504. The valve position feedback voltage is applied to an input resistor 506. An emitter follower stage 508 and a lead circuit 510 comprising parallel connected capacitors 512 and 514 and a series connected resistor 516 provide damping by injecting a signal proportional to valve velocity. The D.C. amplifier 518 is chosen to be a wide band amplifier capable of amplifying not only steady D.C. voltages but, also, A.C. voltages, transient voltages or combinations of these three.

The command and feedback voltages are opposite in polarity. The sum of the values of resistors 500 and 502 and the value of resistor 506 are chosen to have equal values. When the command and feedback voltages are equal in magnitude, the resultant error component of the D.C. amplifier output voltage is zero. When the command and feedback voltages differ in magnitude, the resultant error component of the D.C. amplifier output voltage is proportional to their algebraic sum. Such error component represents, both in magnitude and polarity, the difference between the desired and actual valve position. The magnitude and polarity of the error component are such as to correct the valve position and thus reduce the error component to zero.

The valve position feedback voltage is also applied through emitter follower 508 to input lead circuit 510. A component proportional to the time derivative of the valve position, i.e., to valve velocity, is introduced into the D.C. amplifier output voltage by lead network 510. When valve position remains constant, the valve velocity component is zero. When valve position is changing, the valve velocity component is proportional to the rate of change. This serves to stabilize the servo amplifier system by partly compensating for lag characteristics of the servo valve, hydraulic ram, and associated oil lines.

The series combination of resistors 520 and 522 provide the feedback resistance for the D.C. amplifier. A capacitor 524 provides a feedback capacitance for the D.C. amplifier to attenuate its gain at high frequencies.

The output voltage of D.C. amplifier 518 is amplified by a servo power amplifier 526 to provide the control current for the torque motor and servo valve assembly 528 which is located on the steam turbine. The magnitude and polarity of the output current is such as to correct the steam valve position, and thus reduce the output current to zero.

Steam valve position is sensed by a position transducer 530 which is located on the turbine and connected into an impedance bridge circuit included in the servo amplifier. The A.C. output voltage of the impedance bridge is proportional in magnitude and responsve in phase to steam valve position with zero bridge output chosen to correspond to the full closed valve position. The output of impedance bridge 532 is applied to a phase sensitive full-wave rectifier 534. Both impedance bridge 532 and rectifier 534 are energized by the same exciter 536 reference oscillator voltage, oscillator 536 suitably being an A.C. oscillator having a frequency of 3 KC. The output of rectifier 534 is consequently a full-wave rectified unidirectional voltage proportional in magnitude to the A.C. output voltage of bridge 532. The polarity of the output of rectifier 534 is usually of the same polarity, i.e., negative and is determined by the phase of the output of impedance bridge 532 together with the phase of the reference voltage applied from oscillator 536 to phase sensitive rectifier 534.

A low-pass filter 538 smooths the output voltage from rectifier 534 by removing the unwanted high frequency components. This can be understood when the fact is realized that a component having twice the frequency of the output of oscillator 536 results from the full wave rectification. The output of filter 538 is a relatively smooth D.C. voltage proportional in magnitude and identical in polarity to the full-wave rectified voltage output from phase-sensitive rectifier 534. The output of filter 538 provides the above set forth valve position feedback voltage.

In FIGS. 21 to 23 wherein there is shown a schematic diagram of a circuit represented by the block diagram of FIG. 20. It is understood that in the operation of this circuit, a valve position command voltage is compared with a feedback voltage proportional to the actual valve position.

As mentioned hereinabove, the valve position command voltage is applied to the input T network comprising resistors 500 and 502 and capacitor 504. This command voltage normally may vary from zero volt which is chosen to command a fully closed valve to a suitable positive value such as +5 volts which commands a fully open valve. The values of the components of the T network are so chosen whereby it passes frequencies up to a chosen value such as about 150 c.p.s. with very little attenuation but greatly attenuates frequencies in excess thereof.

A negative voltage proportional to the valve position is taken from filter 538 (FIG. 20). This filter output voltage is connected to a voltage divider comprising a potentiometer 542 and a resistor 544. Potentiometer 542 which is the feedback voltage control stage 540 of FIG. 20 enables gain adjustment for valve position feedback. The valve position feedback voltage from potentiometer 542 is applied to the input resistor 506. This feedback voltage is chosen suitably to have a range of from zero volt which represents a fully closed valve to about —5 volts which represents a fully open valve.

As has been stated in the description of the circuit of FIG. 20, the command and feedback voltages, which are opposite in polarity, are applied to equal input value resistances. When these voltages are equal in magnitude, the resultant error component of the output voltage of D.C. amplifier 518 is zero. When these voltages differ in magnitude, the resultant error component of the output voltage of D.C. amplifier 518 is proportional to their algebraic sum. This error component represents, in both magnitude and polarity, the difference between the desired and actual valve position. D.C. amplifier 518 is an inverting amplifier and consequently a positive error component results at its output when the valve is too far open, and a negative error component results when the valve is too far closed. The magnitude and polarity of the error component are such as to correct the valve position, and thus reduce the error component to zero. Consequently, a positive error component functions to further close the valve and a negative error component causes an increased opening of the valve.

The valve position feedback voltage from potentiometer 542 is also applied to a compound emitter follower comprising transistors 546 and 548 and an emitter resistor 550. This emitter follower provides a low impedance output for driving lead circuit 510. Lead circuit 510, as has been stated hereinabove, injects into D.C. amplifier 518 a signal proportional to valve velocity to stabilize the servo system by partly compensating for lag characteristics of the servo valve, hydraulic ram and associated oil lines.

The closed loop gain of D.C. amplifier 518 is equal to the ratio of the feedback resistance provided by resistors 520 and 522 to the input resistance and is negative. Capacitor 524 provides the feedback capacitance for D.C. amplifier 518 and operates to limit its frequency response. Resistors 521, 523, 525, and 527, and capacitors 529, 531 and 533 may be further included in the circuit to add special lead and/or lag characteristics to the frequency response of D.C. amplifier 518.

Resistors 552, 554, 556 and 558, potentiometer 560, and resistor 562 provide a valve position synchronizing circuit. A voltage from the voltage divider and bridge network of resistor 552, potentiometer 560 and resistors 554, 556 and 558 is taken from the slider of potentiometer 560, the latter voltage being applied to D.C. amplifier input resistor 562. Potentiometer 560 may be utilized for making fine adjustments of the lower steam valve relative to the upper valve.

Potentiometers 564 and 566 provide zero adjustments for impedance bridge 532. Potentiometer 568 is the zero adjustment for servo power amplifier 526.

D.C. amplifier 518 may suitably be a high-gain wideband D.C. inverting amplifier capable of responding not only to D.C. input voltages but also to alternating and transient input voltages and which amplifies an alternating or a transient voltage superimposed upon a D.C. voltage level. D.C. amplifier 518 may contain positive and negative voltage limiters of the fixed feedback type to suitably limit its output voltage to a positive and negative maximum of about 6.0 to 8 volts respectively. It receives its input from summing junction 519.

The servo power amplifier 526 is a wide-band D.C. amplifier with three direct coupled stages of amplification, viz., an input stage, a driver stage and an output stage. The values of the circuit components therein are suitably chosen to provide a given output current for a given input voltage, suitably about —35 to +35 ma. for an input voltage of +5.0 to —5.0 volts. The input of servo amplifier 526 is driven by the output voltage of D.C. amplifier 518. Its output current is fed to the torque motor and servo valve assembly 528 thereby controlling the hydraulic equipment which positions the steam valve.

The output of amplifier 518 is connected through a resistor 570 to a servo power amplifier input transistor 572. The emitter of transistor 572 is connected to the slider of potentiometer 568 which provides the zero set control for power amplifier 528. Potentiometer 568 is energized from the voltage drop across forward biased diodes 569 and 571 which provide temperature compensation for the input stage of servo power amplifier 526 comprising transistor 572.

The output at the collector of transistor 572 is direct coupled to driver stage transistor 574. The emitter of transistor 574 is connected to a source of regulated voltage provided by a breakdown diode 576. The output current from the collector of transistor 574 flows into the base of a transistor 578 and through the base emitter diode of transistor 578 and a resistor 580 to the negative power supply. In this connection, some of the collector current of transistor 574 also flows to the negative supply through a resistor 579.

The output stage of the servo power amplifier consists of transistors 578 and 582. Breakdown diode 584 provides a regulated voltage which is applied to a resistor 586 for operating the output stage. Current to the collector of transistor 578 is supplied through breakdown diode 584, resistor 586, transistor 582 and a resistor 588. The collector of transistor 578 is also coupled through two forward-biased diodes 587 and 589 to the base of transistor 582. This arrangement enables the coupling of the base of transistor 582 to the collector of transistor 578 through a comparatively low impedance.

In operation, when the collector current of transistor 574 increases, increased current flow through the base-emitter resistance of transistor 578 drives its collector more negative. By the coupling through diodes 587 and 589, the base of transistor 582 is also driven more negative, thus increasing the collector-emitter resistance of transistor 582. The torque motor output, which is connected to the emitter of transistor 582 is driven to a less positive potential with respect to common. Thus, when the input voltage to the servo power amplifier becomes more positive, the collector current of transistor 574 increases and "negative" output current flows upward through the torque motor.

When the collector current in transistor 574 is decreased, the collector-emitter resistance of transistor 578 increases and the collector of transistor 578 is driven more positive. In turn, by the coupling through diodes 587 and 589, the base of transistor 582 is also driven more positive thus lowering the collector-emitter resistance of transistor 582. As a result, the torque motor output is driven more positive with respect to common. Thus, when the input voltage to servo power amplifier 526 becomes more negative, the collector current of transistor 574 decreases and "positive" output current flows downward through the torque motor.

The torque motor current flows through a resistor 590 to common. Inverse current feedback is provided in servo power amplifier 526 by the voltage drop across resistor 590 which is proportional to output current flow, together with the circuit formed through a variable resistor 591 and a resistor 592 to the base of transistor 572. This feedback voltage is opposite in phase to the input voltage applied to resistor 570. Potentiometer 591 is utilized to set the gain of the servo power amplifier. A potentiometer 593 provides the adjustment for the maximum positive output current, i.e., the saturation current that the servo power amplifier is capable of delivering. A diode 594 is provided to protect to the base-emitter junction of transistor 582 against excessive reverse-bias voltages by shunting reverse current around this junction and through diode 594. A capacitor 595 is provided to limit the response of the servo power amplifier to high frequencies.

When the turbine steam valve is in the "command," i.e., correct position, the output voltage of D.C. amplifier 518 is zero and consequently the current output from servo power amplifier 526 is also zero. Because both D.C. amplifier 518 and servo power amplifier 526 are inverting amplifiers, a positive output current results when the turbine steam valve is too far closed and a negative output current results when the turbine steam valve is too far open. The magnitude and polarity of the output current of servo power amplifier 526 are such as to correct the valve position and thus reduce the output current to zero. Consequently, a positive output current therefrom opens the valve further and a negative output current therefrom closes it further.

The impedance bridge 532 of FIG. 20 comprises the secondary winding 602 of a transformer 600, potentiometer 564, a resistor 565 and potentiometer 566. Impedance bridge 532 provides an A.C. voltage proportional in magnitude to the position of the turbine steam valve.

The primary winding 601 of transformer 600 is energized by oscillator 536 and secondary winding 602 energizes impedance bridge 532. The position transducer 530 may suitably be a variable inductance device in which a movable pushrod varies the inductance between terminals A and B and B and C thereof differentially. As one's inductance is increased, the other's is decreased. The position of the turbine valve mechanism determines the position of the movable pushrod. This pushrod is suitably set at its zero position when the turbine steam valve is fully closed.

With the pushrod in the zero position, potentiometers 564 and 566 are adjusted for zero electrical output from the impedance bridge. Potentiometer 564 is the in-phase zero adjustment and adjusts to zero the 3,000 c.p.s. component of the bridge output voltage which is in phase with the bridge excitation. Because of differences in the effective resistances of the two halves of the winding of transducer 530, a small quadrature component having the frequency of oscillator 536 may be present in the bridge output voltage. Potentiometer 566 is the quadrature zero adjustment for adjusting to zero that component of the impedance bridge output voltage which is 90 degrees out of phase with the excitation for the impedance bridge.

Both the in-phase and quadrature components of the output voltage of bridge 532 are zero with the turbine steam valve fully closed and the quadrature component remains substantially zero regardless of valve position. However, the in-phase component is proportional in magnitude to valve position. When the valve is partially or fully open, the bridge output voltage and the phase-sensitive rectifier reference voltage, i.e., the voltage at terminal 603 with respect to the voltage at terminal 605 in secondary winding 604, are 180° out of phase. Consequently, if the valve mechanism were to overtravel beyond the zero (valve fully closed) position, the output of impedance bridge 532 and the phase sensitive rectifier reference voltage would be in phase. The output voltage of impedance bridge 532 is applied to phase sensitive recifier 534.

Phase sensitive rectifier 534 as shown in FIGS. 21 to 23 is a full-wave, two-ring demodulator. It comprises secondary winding 604 of transformer 600, transformer 606 comprising a primary winding 608 and secondary windings 610 and 612, resistors 614, 616, 618 and 620 and full wave rectifiers 615 and 619. Phase sensitive rectifier 534 provides a full-wave recetified voltage which is proportional in magnitude to the A.C. output voltage of the impedance bridge. The polarity of the output voltage from phase sensitive rectifier 534 is determined by the phase of the output voltage from bridge 532. Phase sensitive rectifier 534 and is energized by the reference voltage in secondary winding 604 of transformer 600 and is the voltage at terminal 603 with respect to terminal 605.

The output voltage of bridge 532 is applied to primary winding 608 of transformer 606, the magnitude of the voltages in secondary winding 610 and 612 being stepped up a suitable amount such as about 1.3, their phase relationship to the voltage of primary winding 608 being shown by the polarity dots designated thereon.

When the turbine steam valve is fully closed, the output voltage of impedance bridge 532 is zero, no voltages are induced in secondary windings 610 and 612 and the output voltage of phase sensitive rectifier 534 is zero. When the turbine steam valve is partially or fully open, the output voltage of impedance bridge 532 is proportional in magnitude to the amount of valve opening, and is 180° out of phase with reference voltage for phase sensitive recetifier 534. Voltages are induced in secondary windings 610 and 612 and the output voltage of phase sensitive rectifier 534 is a negative full wave rectified voltage, proportional in magnitude to valve position.

On the positive half cycle, the diodes of rectifier 615 are forward biased, i.e., conducting, and the diodes of rectifier 619 are reverse biased (non-conducting). The negative half cycle of voltage induced in secondary winding 612 is coupled through the diodes of rectifier 615 to filter 538. The positive half cycle of voltage induced in secondary winding 610 has no effect on the output voltage of phase sensitive rectifier 534 due to the high resistance of the diodes of rectifier 619.

On the negative half cycle of the reference voltage, the diodes of rectifier 615 are reverse biased and the diodes of rectifier 619 are forward-biased. The negative half cycle of voltage induced in secondary winding 610 at this time is applied to filter 538 since the low forward resistance of the diodes of rectifier 619 effectively connects terminal 611 of winding 610 to common. The positive half-cycle of voltage induced in secondary winding 612 has no effect on the rectifier output voltage since the high reverse resistance of the diodes of rectifier 615 effectively disconnects terminal 613 of secondary winding 612 from filter 538.

If the turbine valve mechanism should overtravel beyond the zero (valve fully closed) position, the output voltage of impedance bridge 532 would be proportional in magnitude to the amount of such overtravel and would be in phase with the rectifier reference voltage. Voltages would be induced in secondary winding 610 and 612 and the output voltage of phase sensitive rectifier 534 would be a positive full-wave rectified voltage proportional in magnitude to valve overtravel.

Filter 538 is a two-stage, low-pass LC filter network comprising inductors 622 and 624 and capacitors 626, 628 and 630 with inductor 624 being tuned to twice the frequency of the output of oscillator 536, i.e., 6 kc. when the oscillator frequency is 3 kc. The filter smooths the full-wave rectified output voltage of phase sensitive rectifier 534 by removing the components therefrom having twice the frequency of exciter 536 and other undesired high-frequency components.

The output of phase sensitive rectifier 534 is applied through inductor 622 to the pi network comprising inductor 624 and capacitors 626, 628 and 630. The values of inductor 624 and capacitor 628 are chosen so that their parallel combination is resonant at a frequency of approximately twice the frequency of the output of oscillator 536.

When the turbine steam valve is fully closed, the input voltage to and consequently the output voltage from filter 538 is zero.

When the turbine steam valve is partially or fully open, the input voltage to filter 538 is a negative full-wave rectified voltage, proportional in magnitude to valve position. Therefore, the output of filter 538 is a substantially smooth negative D.C. voltage proportional in magnitude to valve position.

If the turbine valve mechanism should overtravel beyond the zero (valve fully closed) position, the filter output voltage would be a smooth positive D.C. voltage proportional in magnitude to the amount of overtravel.

While there have been described what are considered to be the preferred embodiments of this invention, it will be obvious to those skilled in the art that various changes and modifications may be made therein and it is, therefore, aimed in the appended claims to cover all such changes and modifications as fall within the spirit and scope of the invention.

What is claimed as new and desired to be secured by Letters Patent of the United States is:

1. In an arrangement comprising a plurality of automatic extraction type elastic fluid multi-stage turbines, at least one of said turbines being adapted to be a master turbine which is electrically controlled, the other of said turbines being of the mechanically controlled type, each of said turbines comprising inlet valve means governing the flow of fluid to the turbine, extraction conduits connected to intermediate stages of the turbine, extraction valve means which governs the proportion of fluid which flows from proximal intermediate stages to distal intermediate stages, and extraction fluid headers common to all of the turbines of said arrangement; the combination comprising first means responsive to speed of said master turbine for generating a first signal which is a function of said speed, second means responsive to the pressures in said extraction headers for generating respective second signals which are functions of the pressures in said extraction headers, means in circuit with said generating means for modifying said first signal with said second signals and for modifying each of said second signals with said first signal and the others of said second signals, a first network controlled by said modified first signal for governing the position of the inlet valve means of said master turbine, second networks respectively controlled by said modified second signals for governing the positions of the extraction valve means of said master turbine, means for slaving said other turbines to said master turbine comprising means for producing first reference voltages representing given fractions respectively of the electrical load of said arrangement for each of said other turbines, means for producing second reference voltages representing selected fractions respectively of extraction header fluid provided by each of said other turbines, means respectively responsive to the application thereto of said first reference voltages and said first signal for producing modified first voltages, means responsive to the application thereto of said modified first voltages, for actuating the mechanical controls of the inlet valve means of said other turbines to continually maintain said sharing of said electrical load in accordance with said given fractions, means responsive to the application thereto of said second reference voltages and said second signals for producing modified second voltages, and means responsive to the application thereto of said modified second voltages for actuating the mechanical controls of the extraction valve means of said other turbines to control the pressures in said extraction headers and to continually maintain said extraction fluid flow for said turbines in accordance with said selected fractions.

2. In an arrangement comprising a plurality of automatic extraction type elastic fluid multi-stage turbines, at least one of said turbines being adapted to be a master turbine in said arrangement which is electrically controlled, the other of said turbines being of a mechanically controlled type slaved to said master turbine, each of said turbines comprising inlet valve means governing the flow of fluid to the turbine, extraction conduits connected to intermediate stages of said turbine and an exhaust conduit, extraction valve means which governs the proportion of fluid which flows from proximal intermediate stages to distal intermediate stages and exhaust and extraction fluid headers common to all of the turbines of said arrangement; the combination comprising first means responsive to the speed of said master turbine for generating a first signal which is a function of said speed, second means responsive to the pressure in said exhaust header for generating a second signal which is a function of the pressure in said exhaust header, means in circuit with said first and second signal generating means for modifying said first signal with said second signal to produce a first resultant signal which is the function of said speed and said exhaust header pressure, third means responsive to the pressure in said extraction headers for generating respective third signals which are functions of the pressures in the respective extraction headers, means in circuit with said generating means for modifying said first resultant signal with said third signals and for modifying each of said third signals with said first resultant signal and the other of said third signals, a first network controlled by said modified resultant signal for governing the position of the inlet valve means of said master turbine, second networks respectively controlled by said modified third signals for governing the positions of the extraction valve means of said master turbine, means for producing first reference voltages representing given fractions respectively of said exhaust header fluid and the share of the electrical load of said arrangement for each of said slaved turbines, means for producing second reference voltages representing selected fractions respectively of extraction header fluid flow for each of said slaved turbines, means respectively responsive to the application thereto of said first reference voltages and said second signal for producing modified first voltages, means responsive to the application thereto of said modified first voltages for actuating the mechanical controls of the inlet valve means of said slaved turbines to control the pressure in said exhaust header and to continually maintain said sharing of said electrical load and the exhaust header fluid flow of said slave turbines in accordance with said given fractions, means responsive to the application thereto of said second reference voltages and said third signals for producing modified second voltages, and means responsive to the application thereto of said modified second voltages for actuating the mechanical controls of the extraction valve means of said slaved turbines to control the respective pressures in said extraction headers and to continually maintain said extraction fluid flows for said slave turbines in accordance with said selected fractions.

3. In an arrangement comprising a plurality of automatic extraction type elastic fluid multi-stage turbines, at least one of said turbines being of the double automatic extraction noncondensing type and adapted to be a master turbine which is electrically controlled, the others of said turbines being of the mechanically controlled type, said master and each of said other turbines comprising inlet valve means governing the flow of fluid to said turbines, said master turbine comprising first and second extraction conduits connected to first and second intermediate stages of said turbine and an exhaust conduit, first extraction valve means which governs the proportion of fluid which flows from a first intermediate stage to a second stage, and second extraction valve means which governs the proportion of fluid which flows from the second intermediate stage to a succeeding stage, said other turbines including first and second extraction conduits and exhaust conduits, and first and second extraction valve means, first and second extraction fluid headers and an exhaust fluid header common to all of the turbines of said arrangement; the combination comprising first means responsive to the speed of said master turbine for generating a first signal which is a function of said speed, second means responsive to the pressure in said exhaust header for generating a second signal which is a function of the pressure in said exhaust header, means in circuit with said first and second signal generating means for modifying said first signal with said second signal to produce a first resultant signal which is a function of said speed and said exhaust header pressure, third means for responsive to the pressure in said first extraction header for generating a third signal which is a function of the pressure in said first extraction header, fuorth means responsive to the pressure in said second extraction header for generating a fourth signal which is a function of the pressure in said second extraction header, means in circuit with said generating means for modifying said first resultant signal with said third and fourth signals, for modifying said third signal with said first resultant and fourth signals, and for modifying said fourth signal with said first resultant and third signals, a first network controlled by said modified first resultant signal for governing the position of said inlet valve means in said master turbine, a second network controlled by said modified third signal for governing the position of said first extraction valve means of said master turbine, a third network controlled by said modified fourth signal for governing the position of said second extraction valve means of said master turbine, means for slaving said other turbines to said master turbine comprising means for producing first reference voltages representing given fractions respectively of said exhaust header flow and share of the electrical load of said arrangement for each of said other turbines, means for producing second reference voltages representing selected fractions respectively of said first extraction header flow for each of said other turbines, means for producing third reference voltages representing chosen fractions respectively of second extraction header fluid flow for each of said other turbines, means respectively responsive to the application thereto of said first reference voltages and said second signal for producing modified first voltages, means responsive to the application thereto of said modified first voltages for atctuating the mechanical controls of the inlet valve means of said other turbines to control the pressure in said exhaust header and to continually maintain said sharing of said electrical load and said exhaust fluid flow of said other turbines in accordance with said given fractions, means responsive to the application thereto of said second reference voltages and said third signals for providing modified second voltages, means responsive to the application thereto of said modified second voltages for actuating the mechanical controls of the first extraction valve means of said other turbines to control the pressure in said first extraction header and to continually maintain said first extraction header fluid flow for said turbines in accordance with said selected fractions, means responsive to the application thereto of said third reference voltages and said fourth signals for producing modified third voltages, and means responsive to the application thereto of said modified third voltages for actuating the mechanical controls of the second extraction valve means of said other turbines to control the pressure in said second extraction header and to continually maintain said second extraction header fluid flow for said other turbines in accordance with said chosen fractions.

4. In an arrangement as defined in claim 3 wherein said means for producing said modified first, second and third reference voltages comprise respective summing means to which there are applied one of said reference voltages and a corresponding one of said first, third and fourth signals.

5. In an arrangement as defined in claim 4 wherein said means for actuating said mechanical controls comprises a transducer which produces a mechanical output in response to an electrial input thereto.

No references cited.

SAMUEL LEVINE, *Primary Examiner.*

R. R. BUNEVICH, *Assistant Examiner.*